United States Patent
Behr et al.

(10) Patent No.: US 12,493,181 B2
(45) Date of Patent: Dec. 9, 2025

(54) OPTICAL SPECTROSCOPY PROBE CONFIGURATIONS FOR FOCUSING LIGHT TO A PORTION OF A SAMPLE

(71) Applicant: Bruker, Ltd., Milton (CA)

(72) Inventors: Bradford B. Behr, Silver Spring, MD (US); Shamus Driver, Markleville, IN (US)

(73) Assignee: Bruker, Ltd., Milton (CA)

( * ) Notice: Subject to any disclaimer, the term of this patent is extended or adjusted under 35 U.S.C. 154(b) by 577 days.

(21) Appl. No.: 17/180,302

(22) Filed: Feb. 19, 2021

(65) Prior Publication Data

US 2021/0263306 A1    Aug. 26, 2021

Related U.S. Application Data

(60) Provisional application No. 62/979,817, filed on Feb. 21, 2020.

(51) Int. Cl.
*G02B 27/00* (2006.01)
*G02B 3/04* (2006.01)
(Continued)

(52) U.S. Cl.
CPC ........... *G02B 27/0025* (2013.01); *G02B 3/04* (2013.01); *G02B 19/0085* (2013.01); *G01J 3/0205* (2013.01)

(58) Field of Classification Search
CPC ........ G02B 27/0025; G02B 3/04; G02B 3/06; G02B 3/0056; G02B 3/4412;
(Continued)

(56) References Cited

U.S. PATENT DOCUMENTS 2,730,014 A * 1/1956 Ivanoff ................. G02B 13/00
                                                         396/25
3,476,463 A   11/1969 Kreuzer
(Continued)

FOREIGN PATENT DOCUMENTS

JP    1997043057 A  *  2/1997
WO    2015/084676 A1    6/2015
(Continued)

OTHER PUBLICATIONS

Max Riedl, Designing with Toroids, 2004, pp. 1-3 [online], [retrieved Jul. 22, 2023], retrieved from the Internet <URL: https://www.spie.org/news/designing-with-toroids?SSO=1>. (Year: 2004).*
(Continued)

*Primary Examiner* — James R Greece
(74) *Attorney, Agent, or Firm* — SMART & BIGGAR LP; Tonino Rosario Orsi

(57) ABSTRACT

Sample optic assemblies are described that may have at least one optical element that is positioned and has one or more surfaces shaped to focus separate sections of a collimated excitation light beam to: (a) create at least one focal point or at least one focal line at one or more portions of a surface or an interior of a sample while compensating for optical aberrations that are created by an optical window or a transparent container that is adjacent the sample to reduce the size of and/or sharpen the at least one focal spot or the at least one focal line; (b) to create a plurality of focal spots, an array of discrete focal spots, at least one focal line, or at least one focal circle, at one or more portions of a surface or an interior of the sample or (c) to achieve (a) and (b).

20 Claims, 13 Drawing Sheets

(51) Int. Cl.
*G02B 19/00* (2006.01)
*G01J 3/02* (2006.01)

(58) Field of Classification Search
CPC ............ G02B 19/0033; G02B 19/0085; G02B 6/3624; G02B 21/34; G02B 21/65; G02B 5/09; G01J 3/44; G01J 3/0205
USPC .......................................................... 359/708
See application file for complete search history.

(56) References Cited

U.S. PATENT DOCUMENTS

| | | | |
|---|---|---|---|
| 4,657,352 A | | 4/1987 | Suda et al. |
| 5,011,284 A | | 4/1991 | Tedesco et al. |
| 5,112,127 A | | 5/1992 | Carrabba et al. |
| 5,377,004 A | | 12/1994 | Owen et al. |
| 5,751,415 A | * | 5/1998 | Smith ............... G01N 21/65 356/301 |
| 5,991,082 A | * | 11/1999 | Tsunashima ......... G02B 27/126 359/640 |
| 6,031,619 A | * | 2/2000 | Wilkens ................ G01J 3/36 250/226 |
| 6,292,304 B1 | | 9/2001 | Kim et al. |
| 6,483,581 B1 | | 11/2002 | Ben-Amotz et al. |
| 6,831,745 B2 | | 12/2004 | Marquardt et al. |
| 6,977,729 B2 | | 12/2005 | Marquardt et al. |
| 7,623,908 B2 | * | 11/2009 | Boppart ............... G01J 3/44 356/460 |
| 8,159,907 B2 | * | 4/2012 | Nagatomi ........... G11B 7/1359 369/112.25 |
| 8,284,490 B2 | * | 10/2012 | Byren ................. G02B 1/007 359/580 |
| 9,110,301 B2 | * | 8/2015 | Lippert ............... G02B 21/06 |
| 9,897,771 B1 | * | 2/2018 | Murphy, Jr. .......... G02B 7/003 |
| 9,976,903 B2 | * | 5/2018 | Oto ..................... G01J 3/0224 |
| 10,024,798 B2 | * | 7/2018 | Akkus ................. G01J 3/0208 |
| 10,509,210 B2 | * | 12/2019 | Cook .................. G02B 13/146 |
| 11,028,003 B2 | * | 6/2021 | Grundmueller .... B23K 26/0006 |
| 2004/0136103 A1 | * | 7/2004 | Slater .................. G02B 1/02 359/642 |
| 2006/0012785 A1 | * | 1/2006 | Funk ................... G01J 3/10 356/301 |
| 2007/0205379 A1 | * | 9/2007 | Nelson ................ G02B 6/06 250/227.29 |
| 2012/0057238 A1 | * | 3/2012 | Byren ............... G02B 27/0025 359/588 |
| 2014/0264097 A1 | | 9/2014 | Heanue et al. |
| 2016/0154236 A1 | * | 6/2016 | Siebenmorgen ... G02B 27/0025 359/385 |
| 2018/0136132 A1 | * | 5/2018 | Zhao .................. G01J 3/0216 |
| 2018/0267286 A1 | * | 9/2018 | Bonzon ............... G02B 21/34 |
| 2018/0284010 A1 | * | 10/2018 | Scarcelli ............. G16B 20/00 |
| 2018/0314047 A1 | * | 11/2018 | Shimada ............ G02B 21/0076 |
| 2019/0029510 A1 | | 1/2019 | Temple |
| 2020/0041774 A1 | * | 2/2020 | Zhang .............. G03F 7/70225 |
| 2020/0089015 A1 | * | 3/2020 | Reichow .............. G03B 21/56 |
| 2020/0257110 A1 | * | 8/2020 | Owen ............... G02B 27/0037 |
| 2021/0068665 A1 | * | 3/2021 | Pahlevaninezhad ... G02B 1/002 |
| 2021/0199504 A1 | * | 7/2021 | Behr .................. G01J 3/0218 |
| 2022/0196557 A1 | * | 6/2022 | Zheng ................ G01J 3/0278 |
| 2023/0093989 A1 | * | 3/2023 | Mahajan ............. G01J 3/0224 356/437 |

FOREIGN PATENT DOCUMENTS

| | | | | |
|---|---|---|---|---|
| WO | 2018182526 A1 | 10/2018 | | |
| WO | 2019145005 A1 | 8/2019 | | |
| WO | WO-2021011709 A1 | * | 1/2021 | ......... G01N 21/6458 |

OTHER PUBLICATIONS

Lens Form: Sphere, Cylinder, and Axis, 2010, pp. 1-8 [online], [retrieved Jul. 24, 2023], retrieved from the Internet <URL: https://www.laramyk.com/resources/education/lens-form-and-theory/lens-form-sphere-cylinder-and-axis/>. (Year: 2010).*
Romolo Savo et al., Observation of Mean Path Length Invariance in Light-Scattering Media, 358 Science 765-768 (2017). (Year: 2017).*
Jason G. Dwight et al., Lenslet Array Tunable Snapshot Imaging Spectrometer (LATIS) for Hyperspectral Fluorescence Microscopy, 8 Biomedical Optics Express 1950-1964 (2017). (Year: 2017).*
Sandy Wu, What is a Ball Lens?, 2018, pp. 1-4 [online], [retrieved Jul. 22, 2023], retrieved from the Internet <URL: https://www.linkedin.com/pulse/what-ball-lens-sandy-wu>. (Year: 2018).*
Bijun Yang et al., Disposable Protective Sheath for Fiber-Optic Raman Probe, 45 Applied Spectroscopy 512-513 (1991). ( Year: 1991).*
Yoshitomo Kobori et al., Novel Device for Male Infertility Screening with Single-ball Lens Microscope and Smartphone, 106 Fertility and Sterility® 574-578 (2016). (Year: 2016).*
Fan Zhi-Bin et al., A Broadband Achromatic Metalens Array for Integral Imaging in the Visible, 8 Light: Science and Applications 1-10 (2019). (Year: 2019).*
Easier English™ Student Dictionary 181 (2003). (Year: 2003).*
Sergio Barbero et al., Optical Aberrations of Intraocular Lenses Measured In Vivo and In Vitro, 20 Journal of the Optical Society of America 1841-1851 (2003). (Year: 2003).*
Herbert Gross (ed.), Handbook of Optical Systems, vol. 3: Aberration Theory and Corection of Optical Systems 377-379 (2007). (Year: 2007).*
Minimizing Spherical Aberration: Make the Right Lens Choice for Your Imaging System, 2019, pp. 1-7 [online], [retrieved Sep. 14, 2024], retrieved from Internet <URL: https://www.lumenera.com/blog/minimizing-spherical-aberration-make-the-right-lens-choice-for-your-imaging-system#:~:text=...brightness>. (Year: 2019).*
Six Optical Aberrations that Could be Impacting Your Vision System, 2020, pp. 1-11 [online], [retrieved Sep. 12, 2024], retrieved from the Internet <URL: https://www.lumenera.com/blog/six-optical-aberrations-that-could-be-impacting-your-vision-system>. (Year: 2020).*
Day et al., "A miniature confocal Raman probe for endoscopic use", Physics in Medicine & Biology, 2009, 54(23): 7077-7087.
Stevens et al., "Miniature standoff Raman probe for neurosurgical applications", J. Biomed. Opt., 2016, 21(8): 087002-1 to 087002-6.
International Search Report and Written Opinion mailed Apr. 2021 in International Patent Application No. PCT/CA2020/050191 (11 pages).
European Search Report dated Apr. 29, 2024 in European Patent Application No. 21756537.3 (11 pages).
Schleusener et al., Design and technical evaluation of fibre-coupled Raman probes for the image-guided discrimination of cancerous skin, Measurement Science and Technology, vol. 25, No. 3 (Feb. 2014), p. 35701 (13 pages).
Tang Ming et al. High sensitivity and resolution integrated optical system for portable Raman spectrometer, Applied Optics, vol. 55, No. 26 (Sep. 2016), p. 7195, <https://opg.optica.org/directpdfaccess/000d0e5b-e101-4d31-8d98e5fcf4a11132_349720/ao-55-26-7195.pdf?da=1&id=349720&seq=0&mobile=no> (9 pages).

* cited by examiner

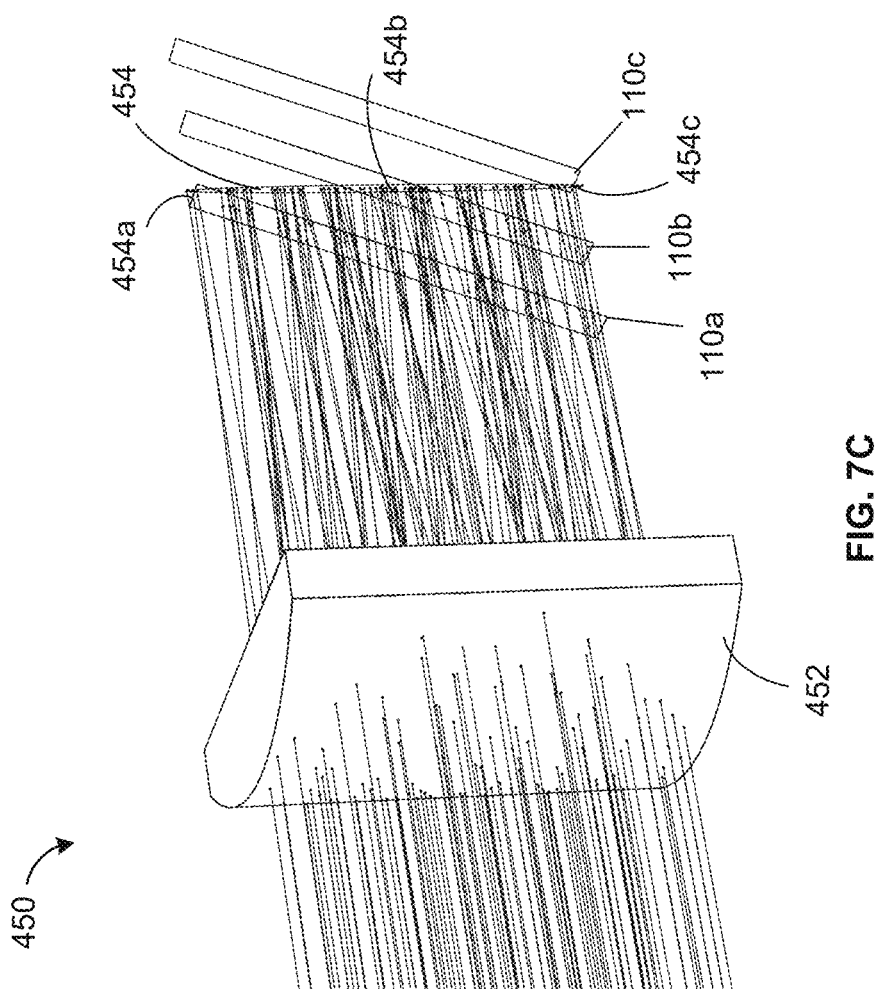

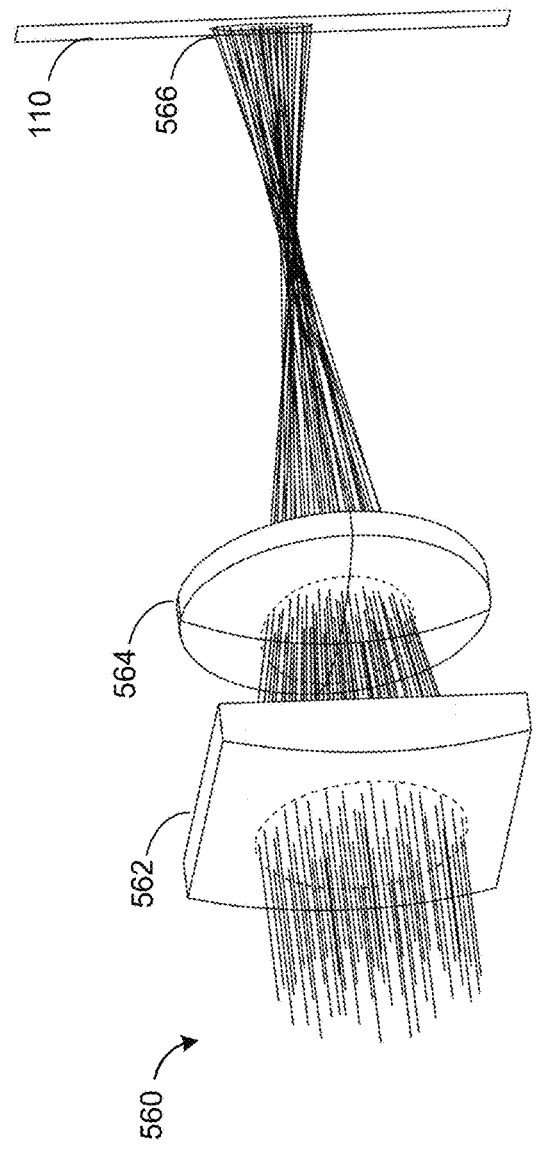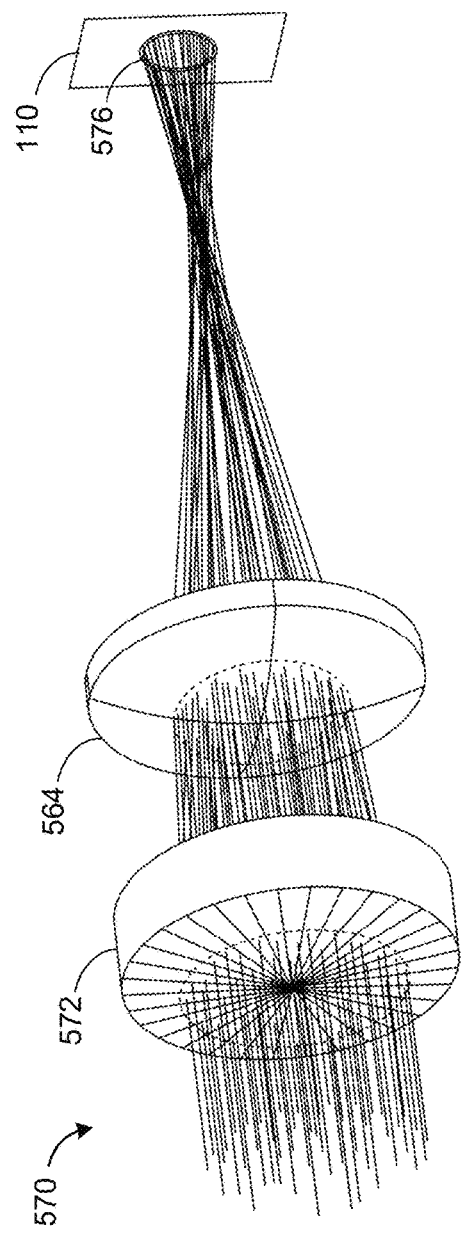

OPTICAL SPECTROSCOPY PROBE CONFIGURATIONS FOR FOCUSING LIGHT TO A PORTION OF A SAMPLE

CROSS-REFERENCE TO RELATED APPLICATION

This application claims the benefit of U.S. Provisional Patent Application No. 62/979,817 filed Feb. 21, 2020 and the entire contents of U.S. Provisional Patent Application No. 62/979,817 are hereby incorporated herein in its entirety.

FIELD

Various embodiments are described herein that generally relate to the field of optical spectroscopy and more specifically relate to components of a Raman spectroscopy sample probe which illuminates the sample with a laser beam and collects light scattered back from the sample.

BACKGROUND

Raman spectroscopy is an analytical method wherein a laser beam, containing laser photons having a certain wavelength, is used to illuminate a sample, which may be in a solid, crystalline, liquid, or gaseous form, and a small fraction of the laser photons shift to different wavelengths as they scatter from the molecules of the sample. The amount of wavelength shift depends on the structure of the sample molecules. Therefore, different types of sample molecules will generate different spectral patterns in the scattered light from the sample, which can be analyzed to identify and quantify the chemical composition of the sample. However, the Raman scattering effect is very weak so the wavelength-shifted signal is usually quite faint. As such, it is advantageous to collect as much of the scattered light from the sample as possible. In addition, the sample may be heterogeneous and it is therefore advantageous to illuminate a large enough area or volume of the sample such that the spectroscopic analysis results are representative of the whole sample. Further, the sample may be in a container or behind a barrier which can distort the illumination beam and/or the scattered light and it is therefore advantageous to correct for such distortions.

SUMMARY OF VARIOUS EMBODIMENTS

In one aspect, in accordance with the teachings herein, there is provided a sample optic assembly for an optical spectroscopy probe, wherein the sample optic assembly comprises: at least one optical element that is positioned for receiving a substantially collimated excitation light beam and directing light rays towards a sample that is behind an optical window or within a transparent container, the at least one optical element being positioned and having one or more surfaces that are shaped to: project the light rays through the optical window or transparent container to focus the light rays into at least one focal spot or at least one focal line which are at one or more portions of a surface or an interior of the sample; collect resulting scattered light from the sample, and compensate for optical aberrations that are created by the optical window or the transparent container to reduce the size of and/or sharpen the at least one focal spot or the at least one focal line, wherein the collected resulting scattered light is used by an optical spectroscopy analysis system to measure spectroscopic information about the one or more portions of the sample.

In at least one embodiment, the at least one optical element comprises one or more aspheric optical elements.

In at least one embodiment, the at least one optical element comprises a toroidal optical element, having a first profile along a first axis and a second profile along a second axis where the first and second axes are perpendicular to one another and the first and second profiles are different.

In at least one embodiment, the at least one optical element comprises: (a) one or more spherical optical elements and/or (b) one or more spherically toroidal optical elements.

In at least one embodiment, the at least one optical element comprises: an aspherical focuser having a focal position; and a spherical optical element with at least one spherical surface that is substantially centered upon the focal position of the aspherical focuser, wherein the sample is placed at or near the focal position.

In at least one embodiment, the spherical optical element comprises a full sphere optical element or a partial sphere optical element.

In at least one embodiment, the at least one optical element has at least one surface that is shaped to create a plurality of focal spots, at least one focal line, or at least one focal circle.

In another aspect, in accordance with the teachings herein, there is provided a sample optic assembly for an optical spectroscopy probe, wherein the sample optic assembly comprises: at least one optical element that is positioned for receiving a substantially collimated excitation light beam and directing light rays towards a sample, the at least one optical element being positioned and having one or more surfaces that are shaped to: project and focus the light rays to create a plurality of focal spots, an array of discrete focal spots, at least one focal line or at least one focal circle at one or more portions of a surface or an interior of the sample; and collect resulting scattered light from the sample, wherein, the collected resulting scattered light is used by an optical spectroscopy analysis system to measure spectroscopic information about the one or more portions of the sample.

In at least one embodiment, the at least one optical element has at least one surface which is spherical, aspherical, cylindrical, acylindrical, toroidal, or axicon.

In at least one embodiment, the at least one optical element has at least one profile for creating the focal line with a length that is smaller, substantially the same, or larger than the diameter of the collimated excitation light beam that is received by the at least one optical element prior to transmission to the sample.

In at least one embodiment, the at least one optical element comprises at least one optical element including at least one lens, at least one mirror, or a combination thereof, that collectively provide a plurality of optical surface regions that are disposed and operate in parallel with one another to focus separate sections of the substantially collimated excitation light beam to simultaneously create the plurality of focal spots, a plurality of focal lines, or a plurality of focal circles that are disposed at the one or more portions of the surface or the interior of the sample.

In at least one embodiment, the at least one optical element includes a lenslet array or an array of reflective mirror surfaces that collectively provide a plurality of optical surface regions that are disposed and operate in parallel with one another to create the plurality of focal spots, a plurality of focal lines, or a plurality of focal circles in a pattern including a line, a grid, or other lateral distribution suited to the sample when the sample optic assembly receives the substantially collimated excitation light beam.

In at least one embodiment, the plurality of optical surface regions have different focal lengths or are placed at different positions along the optical axis of the substantially collimated excitation light beam to create the plurality of focal spots at positions that are: (a) at different distances from the probe head and/or (b) at different depths within the sample.

In at least one embodiment, the at least one optical element has at least one surface which is adapted to compensate for optical aberrations that are created by an optical window or a transparent container between the sample optic assembly and the sample, to reduce the size of and/or sharpen the plurality of focal spots, the at least one focal line, or the at least one focal circle.

In at least one embodiment, the sample optic assembly is integrated into a flow cell that is adjacent to the at least one optical element and includes a flow assembly that defines a sample channel through which the sample flows and an optical window that is disposed on a surface of the flow cell and adjacent to the sample channel for receiving the at least one focal spot, the at least one focal line, or the at least one focal circle.

In at least one embodiment, the flow assembly comprises a shallow sample channel portion and the at least one optical element is adapted to generate the plurality of focal spots or the at least one focal line to be substantially parallel or substantially perpendicular to a direction of sample flow and coincident with the shallow sample channel portion.

In at least one embodiment, the sample channel has a depth that is smaller than a mean optical scattering path length of the sample.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 7C is a schematic showing that when the cylindrical lens (of FIG. 7A) is tilted relative to a solid sample surface, the focal line can be correctly focused upon the surface even if the surface moves relative to the lens.

FIG. 8E shows an example embodiment of a collimated excitation beam passing through a cylindrical lens and then a spherical focusing lens, thereby creating a focal line oriented along a vertical axis upon a sample.

FIG. 8F shows an example embodiment of a collimated excitation beam passing through an axicon lens and then a spherical focusing lens, thereby creating a focal circle upon a sample.

Figure 1:
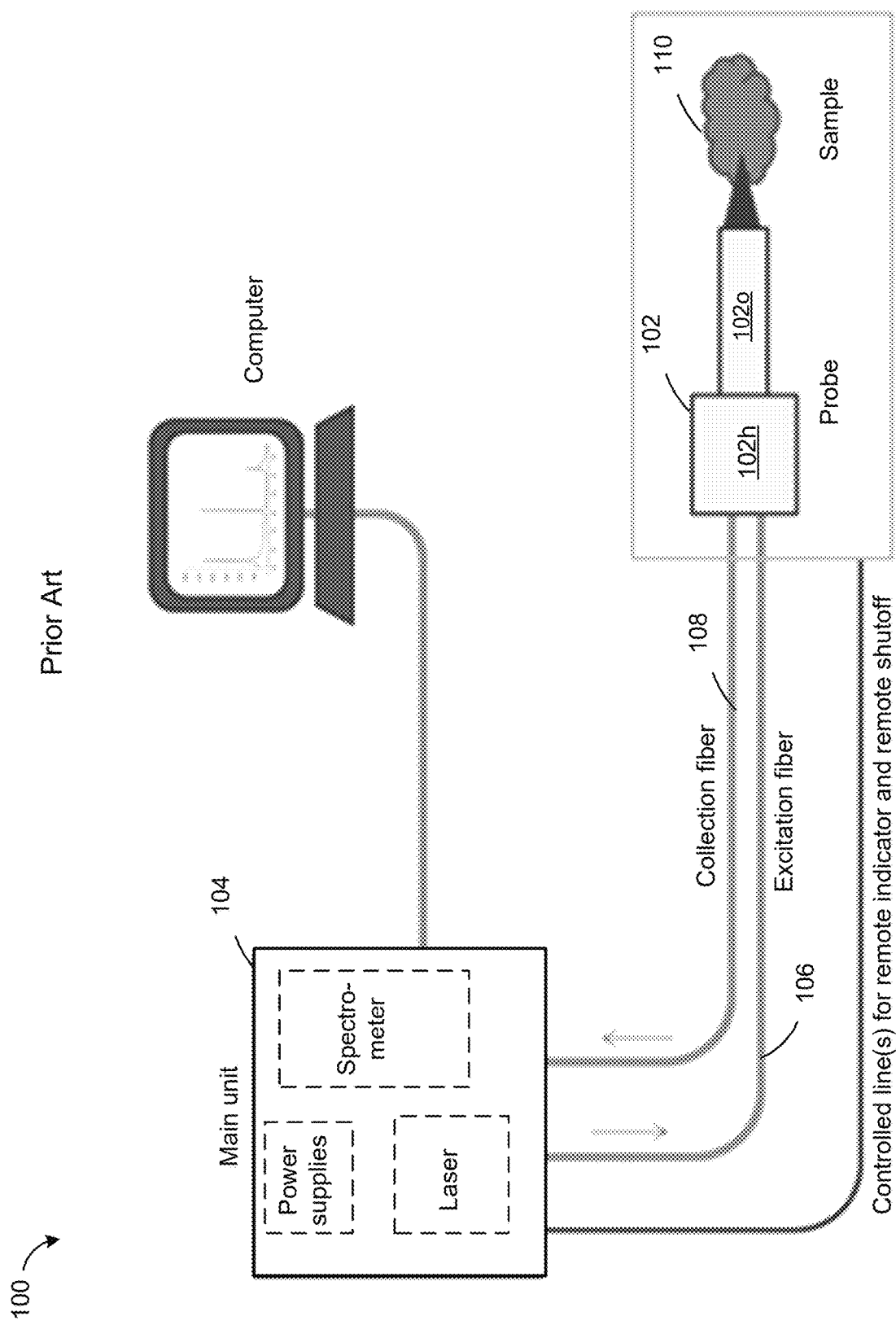
FIG. 1 shows a representative optical spectroscopy analysis system, which in this example is a Raman spectroscopy analysis system, illustrating the relationships among a main analyzer unit (containing a laser, a spectrometer, and power supplies), a probe, and a control computer.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical, optical or electrical connotation. For example, as used herein, the terms coupled or coupling can indicate that two elements or devices can be directly connected to one another or connected to one another through one or more intermediate elements or devices via an electrical signal, an electrical connection, a mechanical element, an optical element, or a light pathway depending on the particular context.

It should be noted that the term "transparent" when used herein can mean that an object such as, but not limited to, a container or a window, for example, may be transparent to a certain degree, such as partially transparent, semi-transparent, or fully transparent.

It should also be noted that, as used herein, the wording "and/or" is intended to represent an inclusive-or. That is, expressions such as "X and/or Y" are intended to generally mean X or Y or both, for example. As a further example, expressions such as "X, Y, and/or Z" are intended to generally mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

In one aspect, the present teachings provide novel concepts in the implementation of a Raman "probe", which is the optical and mechanical subsystem of a Raman analyzer system (e.g. one example of an optical spectroscopy analysis system) that interfaces with a sample under study. In many Raman analyzer systems (such as Raman system 100 illustrated in FIG. 1), a probe 102 is connected to a main analyzer unit 104 via multiple optical fiber cables: one or more "excitation fibers" 106 for transmitting laser energy from the analyzer unit 104 to the probe 102 and one or more "collection fibers" 108 for transmitting the scattered light signal collected by the probe 102 from a sample 110 back to the analyzer unit 104.

Figure 2:
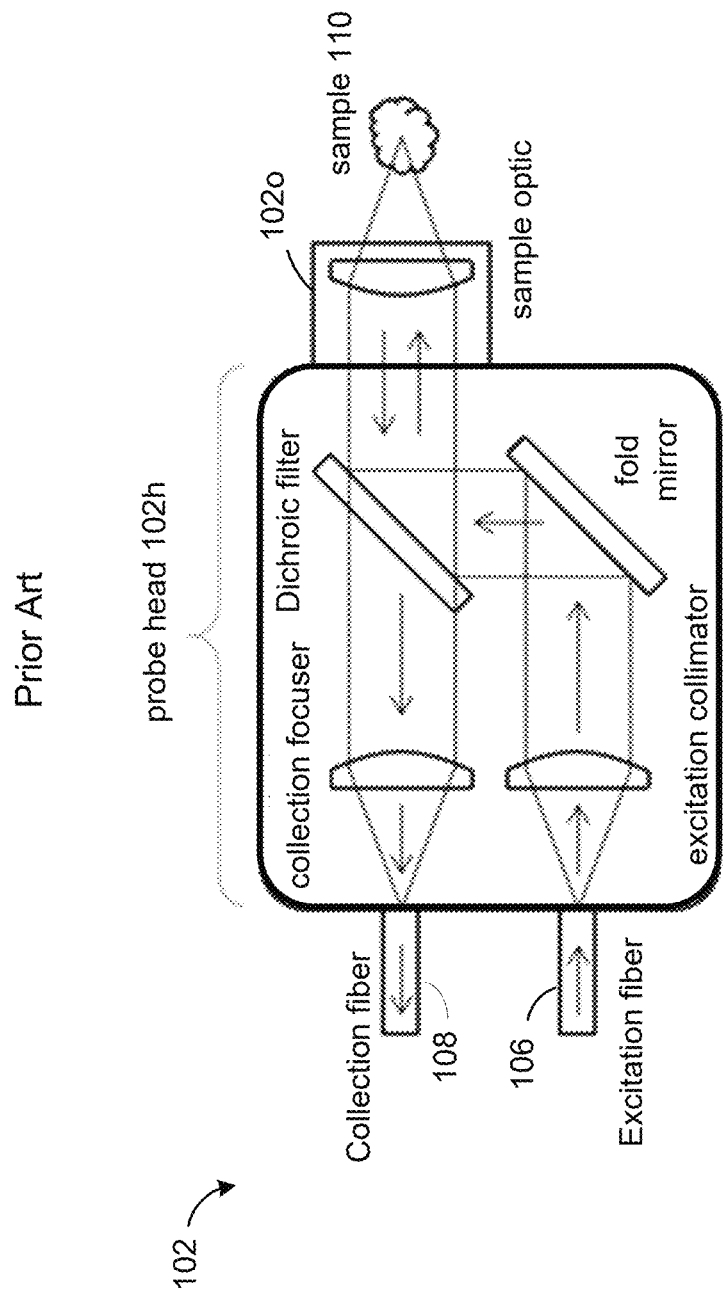
FIG. 2 is an illustration of a typical probe head and sample optic assembly configuration.

The probe 102 is further divided into two broad parts, the "probe head" 102*h* and the "sample optic" 102*o*, as shown in FIG. 2. The probe head 102*h* typically contains optical elements for collimating a diverging laser light beam that is provided from the excitation fiber 106 and directing this collimated beam to the sample optic 102*o*, which in this example is an excitation collimator and a fold mirror. The excitation beam is then transmitted to a portion of a sample which results in scattered light, which is then received by the probe head 102*h* and collimated. Other optical elements within the probe head 102*h* include a dichroic filter for receiving and filtering at least one collimated beam of scattered light returning from the sample optic 102*o* to remove non-Raman-scattered light, and a collection focuser which then focuses the filtered scattered return light down into the collection fiber 108. The collected scattered light is used by the optical spectroscopy analysis system to measure spectroscopic information about the portion of the sample.

In most optical spectroscopy analysis systems that detect backscattered light from a sample, the collimated excitation beam exiting the probe head 102*h* is focused by the sample optic assembly 102*o* onto a small region referred to as the "probe focal point". This region is not truly a point, but rather an image of the source of the excitation light, typically the excitation fiber 106, so it may be called a "focal spot". In practice, this focal spot is not a perfect reproduction of the excitation light source, as the optical elements between the excitation light source and the focal spot will induce various optical aberrations which will blur, distort, and/or usually enlarge the focal spot from its theoretically perfect size and shape. For example, for the sample optic assembly 102o, current state-of-the-art designs typically entail a single plano-convex or biconvex lens or a sapphire ball lens. In these cases, the lenses have one or more surfaces which are parts of a sphere, or a lens which is a complete sphere. Such optical elements are called "spherical optics" by those skilled in the art, even when the optical elements do not comprise a complete sphere. Spherical optical surfaces are relatively easy to fabricate using standard optical manufacturing techniques, but they often do not bring the light from the excitation light source to an optimal focus (i.e. focal spot). This partly results from any single lens with spherical surface profiles being subject to "spherical aberration", which is a distortion effect wherein the focused spot of light is blurry and/or spread out compared to the spot created by a theoretically perfect "paraxial" lens.

Figure 3:
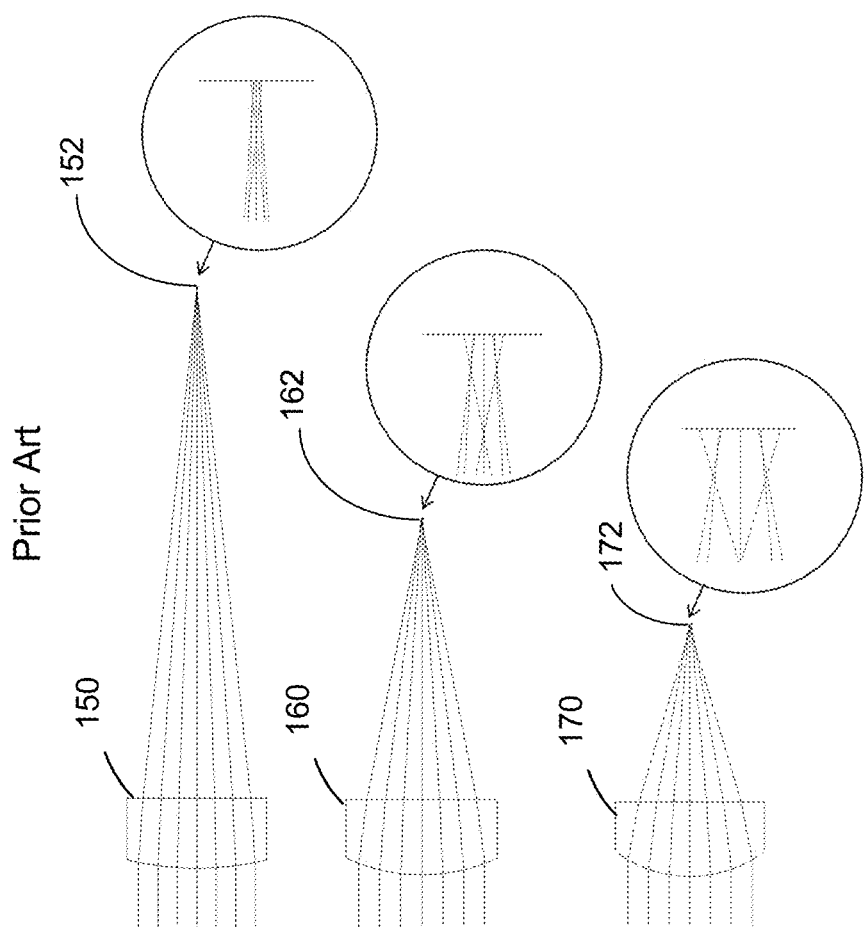
FIG. 3 is an illustration showing increasing optical aberrations with a higher Numerical Aperture (NA) (also known as a faster converging excitation beam).

These aberrations become more severe as the NA of the spherical optical elements becomes higher, as illustrated in FIG. 3. In the top panel of FIG. 3, the focusing lens 150 has a long focal length and a small NA, so the parallel rays propagating from the left to the right are able to be focused to a relatively small focal spot 152 (as shown by the magnified inset image in the top panel). In the middle panel of FIG. 3, the focusing lens 160 has a focal length that is shorter and a NA that is larger compared to the focal length and the NA, respectively, of the focusing lens 150. The spherical and flat surfaces of the focusing lens 160 do not do as good a job of focusing the incident collimated beam to a single spot, so the resulting focal spot 162 is larger than the focal spot 152 in the first panel. In the third panel of FIG. 3, the focusing lens 170 has a focal length that is even shorter and a NA that is quite large compared to the focal length and the NA, respectively, of the focusing lens 150, resulting in yet poorer focusing and a wider focal spot 172.

Because most optical scattering is substantially isotropic, meaning that incoming photons scatter equally in all directions from a sample regardless of the direction that they were originally travelling, it is advantageous for the sample optic assembly of a spectroscopy probe to have as large a NA as possible. Put another way, the larger the NA of the sample optic assembly, the larger the range of scattering angles that will be captured by the spectroscopic probe 102 and thus the stronger and more clearly defined the measured spectroscopic signal will be. However, if spherical optics are used with a large NA, the optical aberrations will detract from the quality of the measured spectroscopic signal (where quality is evaluated according to the signal strength and/or signal-to-noise ratio of the measured signal), as the power of the excitation laser beam is spread out over a larger area, and much of the light scattered from the sample, even if it is collected by the sample optic assembly 102o, will be incorrectly focused and will miss the core of the collection fiber 108.

To overcome this limitation of traditional spherical optics, the inventors have discovered that one can employ an aspheric singlet lens in a sample optic assembly in an optical spectroscopy probe. Computer-controlled polishing machines and advanced glass molding techniques have made aspheric lenses significantly less expensive and more precise than they used to be, so aspheric optical elements can be readily integrated into optical systems such as spectroscopic probes. A properly shaped aspheric lens can create a nearly perfect image from a monochromatic on-axis light beam such as the laser excitation beam, and with low-dispersion glass used for the aspheric optical element(s) in the sample optic assembly, the chromatic aberrations in the return collection beam will be minimized. Some aspheric optics may be utilized in the complex microscope objective lenses that serve as a sample optic assembly for Raman microscopy systems, but for non-imaging spectroscopy a singlet lens can be a better choice, as it is significantly simpler, smaller, less expensive, and transmits more photons than a complex multi-element microscope objective.

Figure 4:
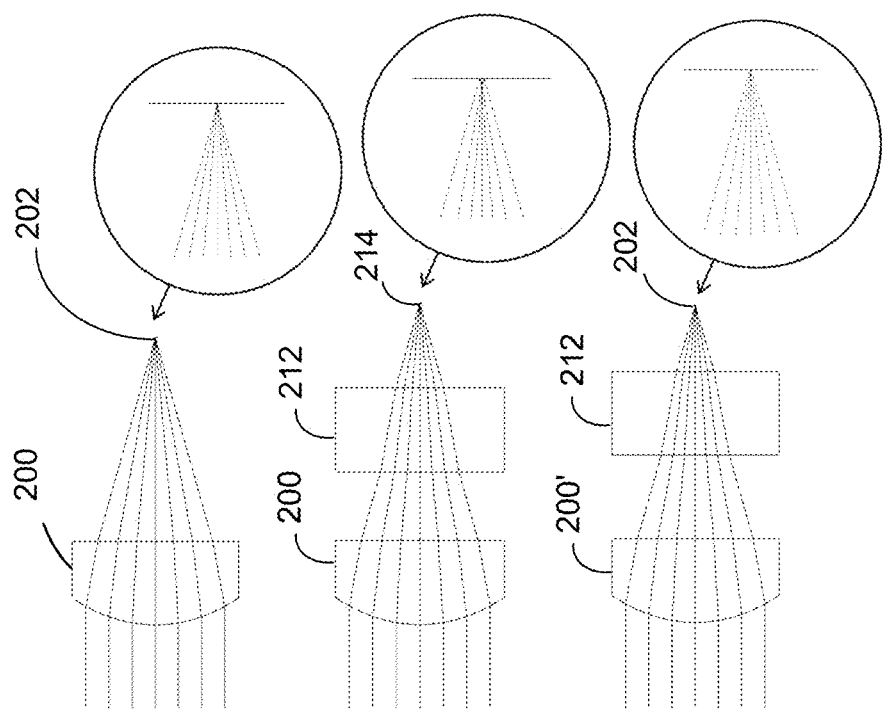
FIG. 4 is an illustration of example embodiments of aspheric lenses that are adapted to have specific optical properties which compensate for the optical aberrations that are created by an external window of a given thickness.

In one aspect, in accordance with the teachings herein, there is at least one embodiment in which aspheric optics are adapted (i.e. the shapes of one of more of their optical surfaces are modified to have specific optical properties) to compensate for the optical aberrations created by the transparent regions of sample containers, vessels, or windows which are part of the sample apparatus that holds the sample or provides a flow pathway for the sample and is separate from the optical spectroscopy measurement system. In laboratory settings, liquid or solid samples may be located inside vials, beakers, cuvettes, or other glass enclosures, and the term container is meant to cover all of these cases. In an industrial setting, the sample liquid may be flowing through a metal pipe with a flat transparent window permitting optical access to the sample, or through a transparent glass tube. In all of these cases, the converging excitation light beam from the sample optic assembly will encounter additional optical aberrations when generating the focal spot at the sample, since the vessel walls or window act as an additional optical element of the full system. Even a window with high-quality, parallel, optically flat surfaces will induce spherical aberrations in a converging or diverging light beam. However, if the optical characteristics of the vessel wall or window are known ahead of time, an aspheric lens or mirror can be designed and manufactured which will correct for the anticipated aberrations and deliver an improved focal spot at a surface of or within a volume of the sample. This scenario is illustrated in FIG. 4. In the top panel of FIG. 4, the aspheric lens 200 has been optimized (e.g. the shape and/or surface) to receive the substantially collimated excitation light beam having light rays which are mutually parallel within a small range of angles (typically within +/−0.2 degrees to +/−1.0 degrees) and direct the light rays to a very sharp focal spot 202. Accordingly, it should be understood that the term collimated light beam can mean a perfectly collimated light beam or a substantially collimated light beam, which might have a small deviation from a perfectly collimated light beam, and the term substantially collimated light beam can also mean a perfectly collimated light beam. In the middle panel of FIG. 4, a thick window 212 has been introduced between the lens 200 and the sample focal spot, creating spherical aberrations which disturb the sharp focus and create a larger and more diffuse focal spot 214. In the bottom panel of FIG. 4, the shape of the surface of the aspheric lens 200' has been altered slightly, and in particular re-optimized to account for and remove the spherical aberrations from the window 212 such that the sharp focus of the focal spot 202 has been restored.

In another aspect, in accordance with the teachings herein, compensation for the distorting effects of the sample container may also be achieved by use of multiple spherical optical elements and/or spherically toroidal optical elements which collectively provide at least one surface that is shaped to compensate for optical aberrations that are created by an optical window or the transparent sample container to reduce the size of and/or sharpen at least one focal spot or at least one focal line at the surface of or within the volume of the sample. Although a multi-element sample optic assembly is more complex than a single aspheric optical element, spherical optics are easier to manufacture and a multi-element sample optic assembly can be used to adjust for different situations by altering the distance between the optical elements of the sample optic assembly to sharpen at least one focal spot or at least one focal line at the surface of or within the volume of the sample.

Figure 5B:
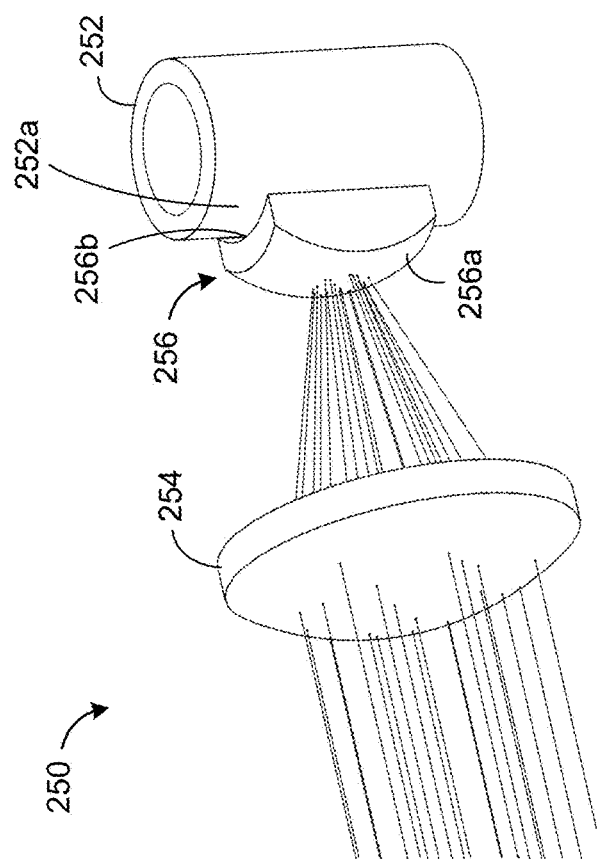
FIG. 5B is another view of the same dual-lens sample optic assembly of FIG. 5A viewed from a different perspective.
Figure 5A:
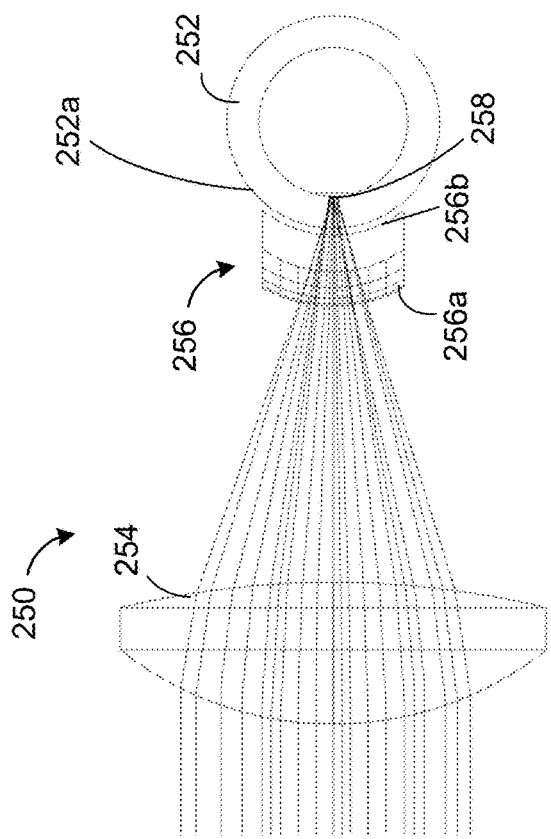
FIG. 5A is a side view of an example embodiment of a dual element sample optic assembly having a best-form biconvex lens (at left) which is focusing a collimated excitation beam onto a sample in a glass vial (circular region at right) and a toroidal element (to the left of the glass vial) that corrects for the aberrations that may be induced by the cylindrical wall of the vial.

By way of example, FIGS. 5A and 5B show two views of a multi-element sample optic assembly 250 for an optical spectroscopy probe that is adapted to measure the liquid contents of cylindrical glass vials 252 having different wall thicknesses. These types of vials commonly measure about 5 mm to 25 mm in diameter, with wall thicknesses of about 1 mm to 5 mm, but may be found in smaller or larger sizes in specialized scenarios. The multi-element sample optic assembly 250 comprises two elements, (1) a "best-form" biconvex spherical singlet 254, and (2) a toroidal lens 256 with a convex spherical first surface 256a and a concave cylindrical second surface 256b, which has substantially the same radius of curvature as the convex exterior cylindrical surface 252a of the vial 252. The diameters of these two lenses 254 and 256 will depend on the size of the collimated excitation beam coming from the probe head (not shown), but may typically be about 5 mm to about 20 mm in diameter, and the best form lens 254 may have a focal length of about 10 mm to about 30 mm. Depending on the thickness of the walls of the vial 252, the spacing between the two elements 254 and 256 of the multi-element sample optic assembly 250 can be adjusted to place the focal spot at the interior surface of the vial.

In another example embodiment, the vial 252 may be replaced by a beaker (not shown) containing a liquid sample, in which case the radius of curvature of the surface 256b of the toroidal lens 256 may be increased to match the exterior surface radius of curvature of the beaker.

In yet another example embodiment, the sample optic assembly 250 may be adapted to measure through the hemispherical bottom of a test tube (not shown), for which the optical element 256 may be adapted further by converting the surface 256b into a spherically concave surface with a radius of curvature substantially matching the radius of curvature of the exterior of the bottom of the test tube.

In yet another example embodiment, the sample optic assembly 250 may be adapted to measure through the flat bottom of a beaker or the flat side of a cuvette (both not shown), for which the optical element 256 may be adapted further by converting the surface 256b of the toroidal lens 256 to a flat surface to match the flat external surface of the beaker bottom or cuvette side.

In another aspect, in accordance with the teachings herein, there is provided at least one embodiment of a sample optic assembly that comprises an aspheric focusing lens and a spherical optical element for which the spherical curved surface(s) are substantially centered upon the focal spot of the aspheric lens, such that the converging light rays from the aspheric lens enter the spherical element perpendicular to the surface at all locations. As such, no aberrations are induced by the spherical element, and the light rays then come to focus in a small focal spot. The sample is placed at this small focal spot, with the spherical element serving as a window or conduit to prevent the sample from leaking into the sample optic assembly. It should be noted that the spherical element is a non-focusing spherical element as it does not perform any focusing action upon the light rays.

Figure 6B:
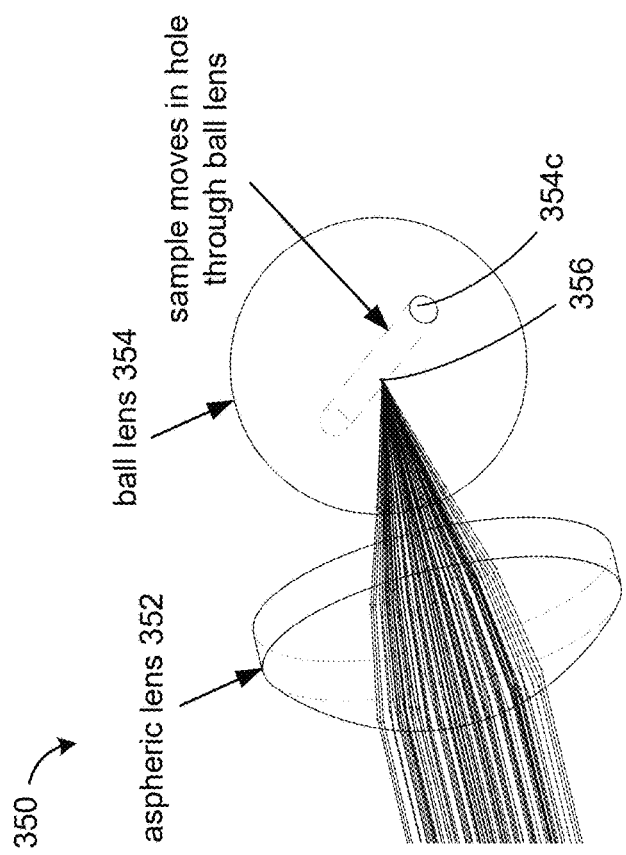
FIG. 6B is another example embodiment of a dual-element sample optic assembly with a spherical element (e.g. a full ball lens) with a hole drilled through the center which serves as a conduit for a fluid (i.e. liquid or gas) sample.
Figure 6A:
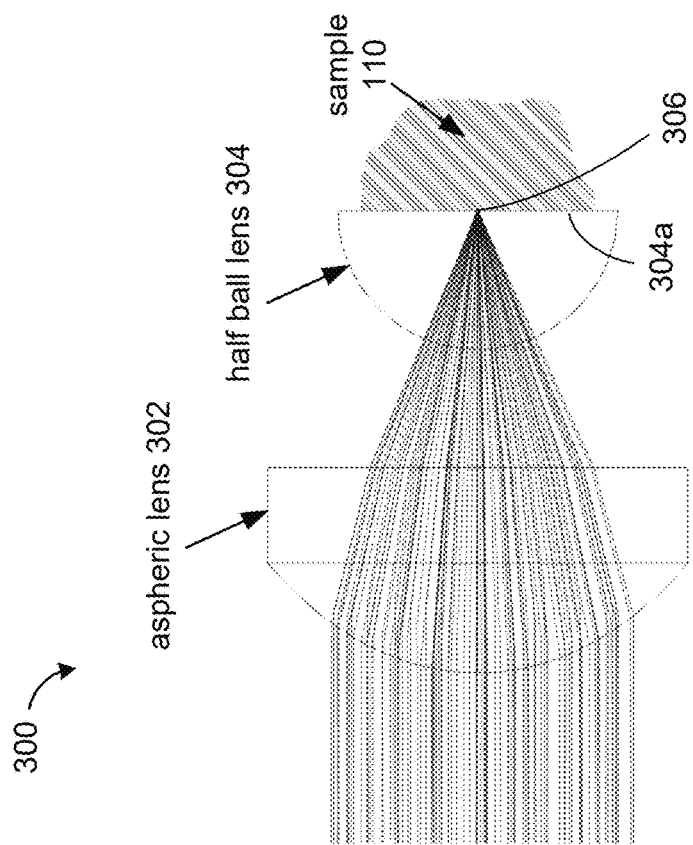
FIG. 6A is an example embodiment of a dual-element sample optic assembly with an aspheric lens (for focusing) and a half-ball lens that serves as a window for interfacing with a solid, liquid, or gas sample.

Referring now to FIG. 6A, shown therein is an example embodiment of a sample optic assembly 300 that comprises an aspheric focusing lens 302 and a non-focusing spherical optical element 304, where the spherical optical element 304 is a half-ball lens having a flat side 304a (i.e. flat surface), and the sample 110 is placed against the flat side 304a of the half ball lens. It should be noted that the sample 110 can have different shapes and only one example is given for illustrative purposes in FIG. 6A. The focal spot 306 is also at the interface between the flat side 304a of the half ball lens and the sample 110. Advantageously, this embodiment provides a means for achieving near-perfect focusing of the focal spot at a location at or very near the surface of the sample 110 that is in contact with the optical element 304, which results in a stronger and more consistent spectroscopic signal than other optical configurations, especially when the sample 110 is opaque or turbid.

Referring now to FIG. 6B, shown therein is an alternative example embodiment of a multi-element sample optic assembly 350 having an aspheric focusing lens 352 and a non-focusing spherical optical element 354. The lens 352 may be similar to the lens 302. In this case, the spherical optical element 354 is a full sphere with a narrow conduit or channel 354c drilled through the center of the sphere to convey a liquid or gas sample past the focal spot 356. This embodiment is advantageous in that the hoses or tubes (not shown) carrying the liquid or gas sample may be coupled directly to the conduit 354c, avoiding metal or epoxy-based seals between the optical element 354 and a metal housing which may be prone to leaking. In use, the conduit 354c may be completely full of liquid (especially if under high pressure) and the sample liquid may be opaque, so the focal spot may be placed at the proximal surface of the sample, which coincides with the proximal inner surface of the conduit 354c. A typical size for the spherical optical elements 304 or 354 may be about 2 mm to about 20 mm in radius, while the aspheric focusing lens 302 or 352 may be about 5 mm to about 25 mm in diameter, and a focal length equal to its diameter. However, in alternative embodiments, all of these dimensions may be smaller or larger than the example ranges provided here.

In both of the example embodiments of FIGS. 6A and 6B, the aspheric lenses 302 and 352 do not need to be specially optimized to counteract the aberrations from a flat window of the sample probe (as was described for the embodiments shown in FIG. 4), since a spherical surface (i.e. from the spherical optical elements 304 and 354) that is concentric on the focal spot 306 and 356 will induce no aberrations and therefore will greatly reduce any spherical aberrations, chromatic aberrations, or other optical aberrations which may otherwise appear with these example embodiments. Furthermore, the spherical elements 304 and 354 may be made of any glass, crystal, or other transparent material depending on the requirements of a particular measurement scenario, with generally no adjustments to the optical design being required to compensate for the different optical indices of refraction of the different materials.

It should be noted that alternative embodiments of the multi-element sample optic assemblies 300 and 350 may use an aspherical mirror such as, but not limited to, an off-axis paraboloid or elliptical mirror, for example, in place of the aspheric lens. Additionally, multiple spherical and/or aspherical mirrors may be used in place of the single aspheric lens, such as a three mirror anastigmat design or an Offner imaging relay.

In another embodiment, in accordance with the teachings herein, toroidal or cylindrical optics can be used with optical spectroscopy probes to bring the excitation beam to a focus along a line rather than a small spot. This is advantageous since illuminating the sample 110 along an extended line provides a more global or averaged assessment of the surface or interior of an inhomogeneous sample while still maintaining a reasonably strong collection signal. While spectroscopic sensing of a larger region of the sample 110 can be achieved by sending the collimated beam directly to the sample 110 with no focusing optics at all, if the sample 110 scatters the incident photons isotropically then only a tiny fraction of the incident photons will backscatter within the small angle leading back into the sample optic assembly 102o of the probe head 102h and to the collection fiber 108.

Figures 7A, 7B:
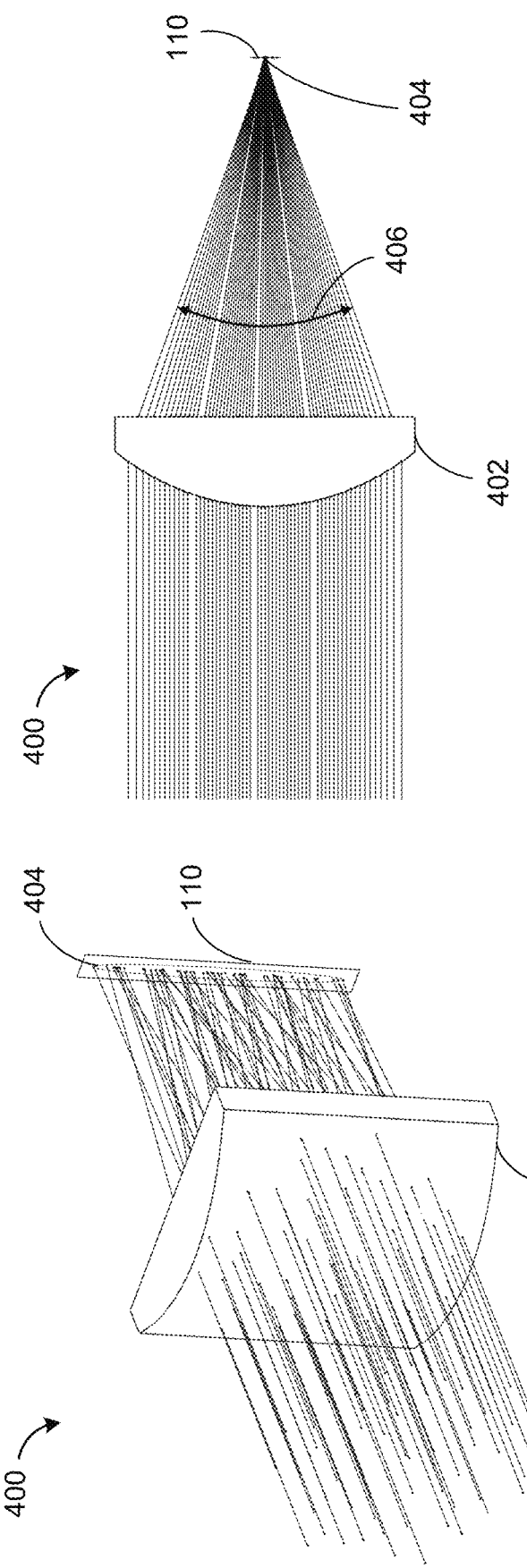
FIG. 7A is a perspective view of a schematic of a simulated collimated excitation beam that travels from the lower left to the upper right and encounters a cylindrical lens, which focuses the beam along the horizontal axis but does not alter the ray trajectories along the vertical axis resulting in a focal line oriented along the vertical axis rather than a focal spot or a focal spot.
FIG. 7B is top view of the same sample optic assembly of FIG. 7A.

Alternatively, in accordance with the teachings herein, a sample optic assembly 400 having a cylindrical sample optic lens 402 as is shown in FIG. 7A and FIG. 7B may be used to capture a substantially larger scattering angle 406 and thus deliver a stronger spectroscopic signal for higher measurement accuracy or better sensitivity of the optical spectroscopy analysis system, while still collecting photons that have backscattered from a larger representative region, e.g. a focal line 404, of the sample 110. The focal line 404 can be considered as a plurality of individual focal spots, each providing a measurement of a different part of the sample 110. This illumination geometry is particularly useful if the sample 110 is moving or flowing in a fixed direction (not shown), as the focal line 404 can be oriented substantially perpendicular to the direction of motion of the sample 110 so that it effectively "sweeps over" a 2-dimensional (2D) area of the moving sample 110 while spectral data is being collected. The diameter or width of the lens 402 may be larger than the diameter of the collimated beam, so the diameter of the lens 402 may typically range from about 2 mm to about 25 mm, and the focal length of the lens 402 is determined by the anticipated location of the sample relative to the sample optic assembly 400. In cases where the focal length of lens 402 needs to be small compared to its width or diameter (i.e. to provide a large NA), it may be advantageous to use an acylindrical shape for one or both surfaces of the lens 402 to maintain good focusing sharpness and avoid aberrations. An acylindrical surface may also be adapted to compensate for aberrations created by an optical window or transparent region of a sample container (not shown) between the sample optic assembly and the sample. It should be noted that although the figures show the focal line oriented in a vertical direction, in particular embodiments the focal line may be oriented in any direction.

Referring now to FIG. 7C, in an alternative embodiment of a sample optic assembly 450, the sample optic assembly includes a cylindrical sample optic lens 452 that can be similar to the lens 402 in shape but is oriented at an oblique angle with respect to the surface of sample 110 so that the focal line 404 reaches different depths within the sample 110, and one portion of the focal line 404 is focused correctly upon the surface of the sample 110, while other portions of the sample 110 are out of focus. For example, three rectangles 110a, 110b and 110c in FIG. 7C represent three different positions of the surface of the sample 110. The cylindrical lens 452 creates a focal line 454. It should be noted that the light rays will pass through the location of the focal line 454 and continue to the right, but the right side of the light rays past the focal line 454 have been truncated in FIG. 7C for better clarity. If the sample 110 is at position 110a, then the focal line 454 will be perfectly focused upon the sample 110 at a location 454a. Alternatively, if the sample 110 is at position 110b, then the focal line 454 will be perfectly focused upon the sample 110 at a location 454b. Alternatively, if the sample 110 is at position 110c, then the focal line 454 will be perfectly focused upon the sample 110 at a location 454c. Intermediate sample positions (not shown) will each have their own respective portion of the focal line 454 perfectly focused upon the sample surface. If the sample 110 moves closer to or farther away from the cylindrical lens 452 then some region of the focal line 454 will still be in focus and thus will provide a consistent spectroscopic signal. The possible size and focal length of lens 452 will be similar to those of lens 402 as mentioned above.

In another aspect, in accordance with the teachings herein, in at least one embodiment, a sample optic assembly having a purely cylindrical or acylindrical optical element (i.e. a cylindrical or acylindrical lens or mirror with similar dimensions as explained above for lens 452) can be used, which will create a focal line with a length equal to the diameter of the collimated excitation beam, as the optical element will cause the collimated beam to converge along a first axis but will not generate any convergence or divergence along a second axis, where the second axis is perpendicular to the first axis.

Figure 8A:
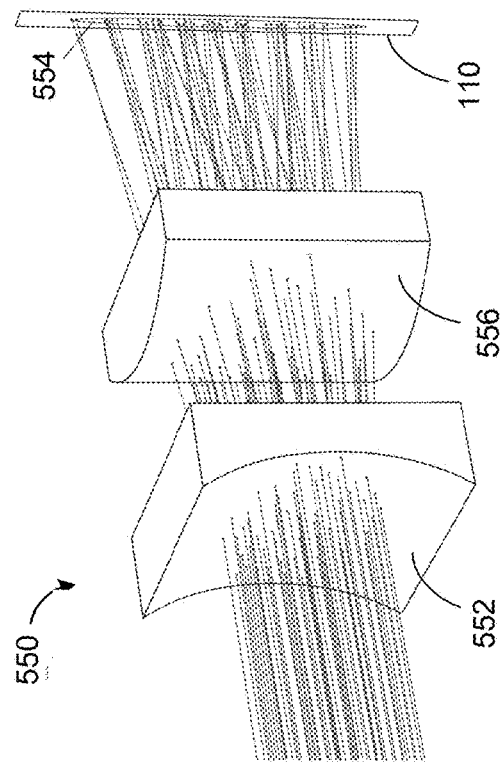
FIG. 8A is a perspective view of a toroidal focusing lens which fully focuses the incident collimated excitation beam along the horizontal axis but only partially focuses the excitation beam along the vertical axis, creating a focal line with a smaller linear dimension (in this case vertically oriented) than the example embodiment of the cylindrical lens of FIGS. 7A-7C.

In another aspect, in accordance with the teachings herein, in an alternative embodiment, there is provided a sample optic assembly 500 having a toroidal optical element 502 which can be adapted to make the length of the focal line larger or smaller than the collimated beam diameter (see FIG. 8A), such that the spectroscopic illumination covers a region 504 of the sample 110 which is best suited to the type of measurement desired. This is because the toroidal optical element 502, by virtue of its surface curvature being different along a first axis (e.g. horizontal in FIG. 8A) as compared to along a second axis (e.g. vertical in FIG. 8A), will strongly converge the collimated beam along the first axis (making the focal spot 504 narrow horizontally) but only weakly converges the collimated beam along the second axis (so the focal spot is spread out into a vertical line). The size of the toroidal optical element and the focal length may be similar to those cited for prior embodiments such as sample optic assemblies 400 and 450. In alternative embodiments, there may be more than one toroidal optical element 502, and the focal line may be oriented in any direction, not just vertically as shown in the figures. Furthermore, in an alternative embodiment, the toroidal optical element 502 may have one or both surfaces which are adapted to compensate for aberrations created by an optical window or transparent region of a sample container (not shown) between the sample optic assembly and the sample.

Figure 8B:
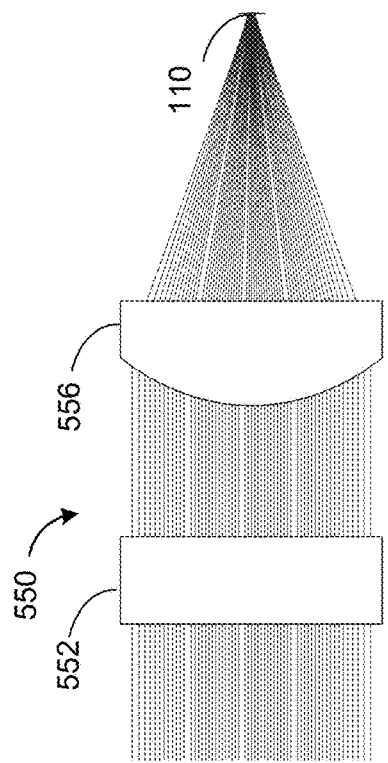
FIG. 8B is a perspective view of two cylindrical lenses including a first diverging lens (e.g. a plano-concave lens) which causes the incident collimated excitation beam to diverge vertically, and a second focusing lens (e.g. a plano-convex lens) which focuses the rays of the vertically divergent excitation beam horizontally to create a focal line with a larger linear dimension (in this case vertically oriented) than the example embodiment of the cylindrical lens of FIGS. 7A-7C.
Figure 8C:
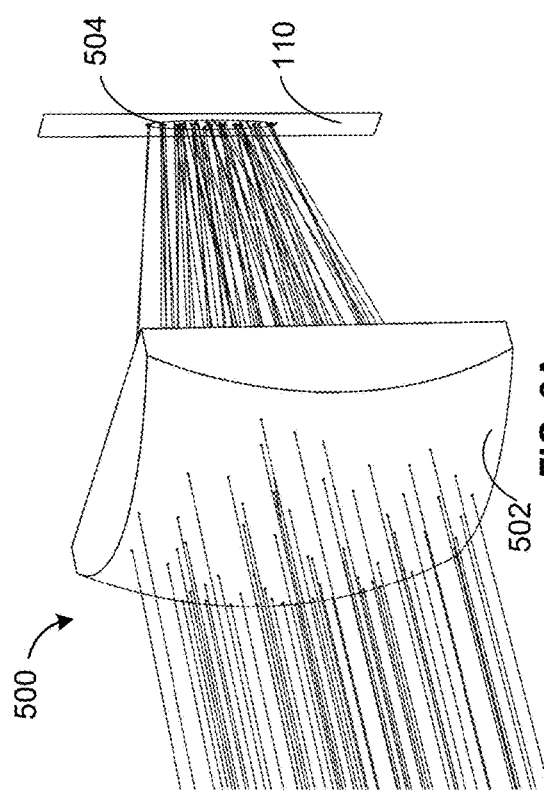
FIG. 8C and FIG. 8D are top and side views of the same sample optic assembly as FIG. 8B that illustrate the action of each of the two lenses upon an incoming incident collimated excitation beam.
Figure 8D:
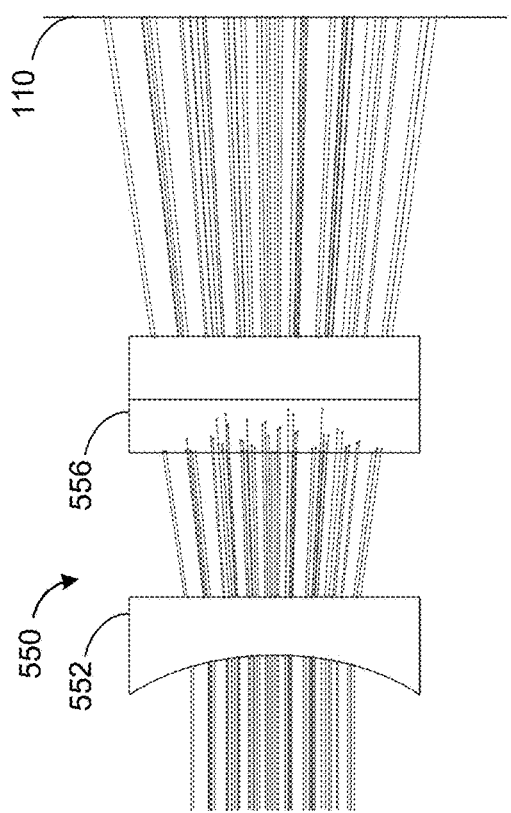

In another aspect, in accordance with the teachings herein, in an alternative embodiment, there is provided a sample optic assembly 550 having a combination of a first lens 552 (which may be a diverging cylindrical optical element) and a second lens 556 (which may be a converging cylindrical optical element) which together focus the collimated beam along the first axis while expanding the beam along the second axis (see FIGS. 8B, 8C, and 8D), creating a long focal line 554 on the sample 110. Both optical elements 552 and 556 may be of similar size and focal length as the cylindrical optics described above, with the caveat that cylindrical lens 552 will have a negative focal length. FIG. 8B shows a perspective view of the sample optic assembly 550 which creates a focal line 554 which is larger in length than the diameter of the original collimated beam. FIG. 8C shows a side view illustrating that the lens 552 causes the beam to diverge along a second axis while the lens 556 does not alter that divergence. FIG. 8D shows a top view illustrating that the lens 556 causes the beam to converge along a first axis while the lens 552 does not alter the path of the collimated beam along that first axis. In another embodiment, the lens 552 may be a converging cylindrical lens which only partially focuses the collimated beam along the second axis, creating a short focal line similar to that shown as line 504 in FIG. 8A. In either case, the lens 552 acts to converge or diverge the collimated beam along the second axis depending upon the geometry of the illumination pattern desired on sample 110. Although these embodiments require more optical elements than the single toroidal lens 502 shown for the sample optic assembly 500 in FIG. 8A, cylindrical optical elements are easier to fabricate than toroidal optical elements and may be available as off-the-shelf lenses or mirrors which can be selected and arranged in accordance with the teachings herein, thereby simplifying the manufacturing process and/or reducing the cost of the sample optic assembly 550. For alternatives of this embodiment, the orientation of the focal line may be vertical, horizontal, or any other orientation. Furthermore, in an alternative embodiment, the optical elements 552 and 556 may have one or more surfaces which are adapted to compensate for aberrations created by an optical window or transparent region of a sample container (not shown) between the sample optic assembly and the sample, for example using an acylindrical lens instead of a cylindrical lens.

In another aspect, in accordance with the teachings herein, a cylindrical lens or mirror may be combined with a standard optical focusing element (such as a spherical or aspherical lens, or focusing mirror) to create a focal line on the sample. For example, in one example embodiment 560 shown in FIG. 8E, a cylindrical optical element, like converging cylindrical lens 562, and a spherical focusing lens 564 are placed in the path of the collimated beam to produce a focused line 566 on the sample 110. The size and focal lengths of the converging cylindrical lens 562 and the spherical focusing lens 564 may be similar to those described for previous embodiments described herein such as sample optic assemblies 400 and 450. In another embodiment, the cylindrical optical element may be a diverging cylindrical lens, which when combined with the spherical focusing lens 564 will similarly produce a focal line on the sample. For alternatives of this embodiment, the orientation of the focal line may be vertical, horizontal, or any other orientation. Furthermore, in an alternative embodiment, the optical elements 562 and 564 may have one or more surfaces which are adapted to compensate for aberrations created by an optical window or transparent region of a sample container (not shown) between the sample optic assembly and the sample.

An additional example embodiment 570 is shown in FIG. 8F, combining an axicon lens 572 with a standard optical focusing element 564. This combination of optical elements will illuminate the sample 110 in a circular path 576. This path traces out the edge of a circle, but does not illuminate the interior region of the circle, and can be considered as a plurality of individual focal spots, each providing a measurement of a different part of the sample 110. A configuration of this sort has similar advantages to the focused line 566 of the example embodiment of FIG. 8E, as the illumination covers an extended region of the sample for a more representative measurement of the sample's properties, but with the illumination still substantially focused along one axis (in this case, the radial axis of a polar coordinate system) in order to achieve better collection efficiency of the scattered light from the sample. Furthermore, in an alternative embodiment, the optical focusing element 564 may have one or more surfaces which are adapted to compensate for aberrations created by an optical window or transparent region of a sample container (not shown) between the sample optic assembly and the sample.

For the configurations described above for FIG. 8E and FIG. 8F, alternative embodiments may reverse the order of the two optical elements, or may merge the two optical elements into one optical element, for instance a single optical element with a cylindrical or axicon profile on its first surface and a spherical focusing profile on its second surface.

Figure 9A:
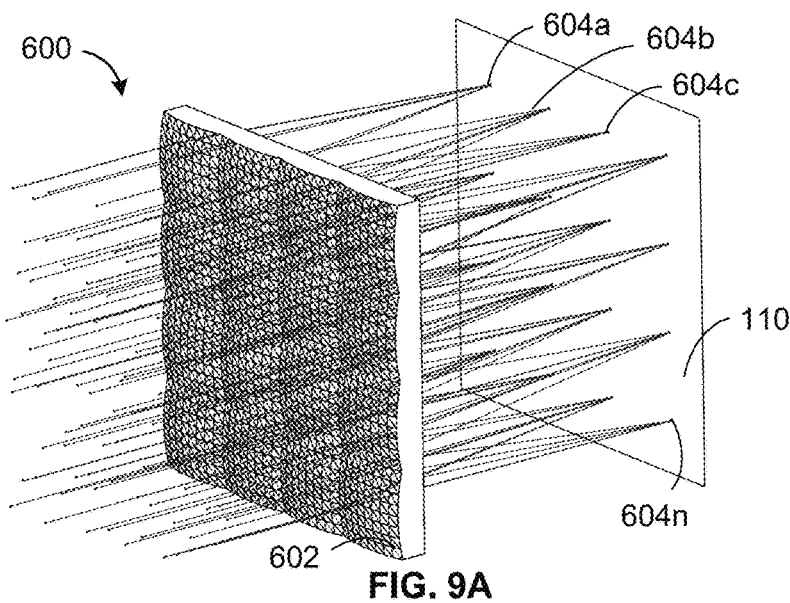
FIG. 9A shows an example embodiment of a lenslet array of 16 lenslets in a 4×4 grid, creating 16 focal spots on the sample focal plane (represented by a square).

In another aspect, in accordance with the teachings herein, a more global or spatially-averaged spectroscopic assessment of the sample 110 may be acquired by placing multiple focusing elements within the path of the collimated beam emanating from the probe head 102h. For example, in one example embodiment shown in FIG. 9A, a sample optic assembly 600 comprises a 2-dimensional array 602 of small lenses (often referred to as a "lenslet array") which, advantageously, collectively focus the collimated excitation beam into multiple focal spots 604a to 604n, and each small lens in the lenslet array 602 also captures and collimates some of the scattered light from its respective focal spot, sending a plurality of parallel collimated collection beams back into the probe head 102h to be filtered and focused onto the collection fiber 108. The measured spectrum will be the weighted average of all the spectra of the returning scattered light beams from each focal spot 604a to 604n, providing a more representative view of the sample 110 as a whole rather than just measuring the sample 110 at a single location. In alternative embodiments, the lenslet array may be a one-dimensional (1D) or 2D array of cylindrical lenses or a 2D array of curved mirrors. Furthermore, in an alternative embodiment, the surfaces of the individual lenslets of lenslet array 602 may be adapted to compensate for aberrations created by an optical window or transparent region of a sample container (not shown) between the sample optic assembly 600 and the sample 110. In a different alternative embodiment, the plurality of focal spots may be changed into a plurality of focal lines or a plurality of focal circles by adapting the surfaces of the individual lenslets of lenslet array 602, or adding an additional optical element (not shown), wherein these modifications may act upon the portions of the substantially collimated beam in a fashion similar to optical element 562 of FIG. 8E or optical element 572 of FIG. 8F.

Figure 9B:
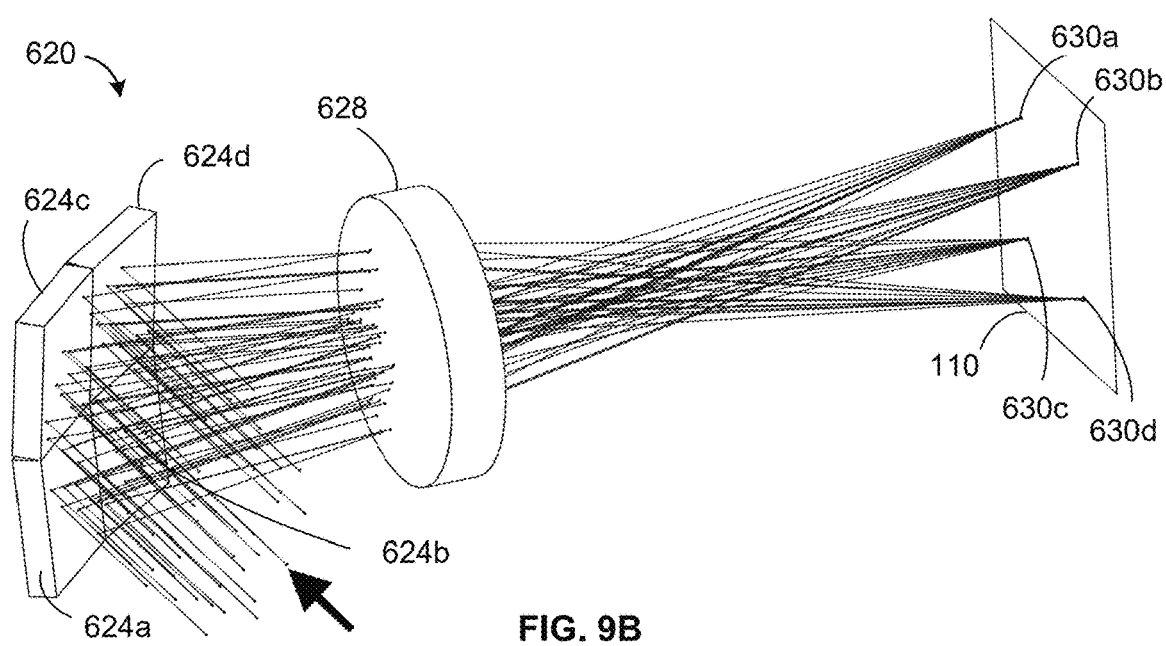
FIG. 9B shows an alternative example embodiment of a 2×2 array of flat mirrors which redirect portions of a collimated excitation beam through a common focusing optical element to create four focal spots on the sample focal plane (represented by a square).

In an alternative embodiment, referring now to sample optic assembly 620 shown in FIG. 9B, a 1D or 2D array of flat mirrors 624a to 624d may redirect multiple beam portions of an incoming collimated beam to one or more focusing optical elements 628 such that the multiple beam portions are each focused to different focal spots at different locations 630a to 630d on the surface of or within the interior of the sample 110. The flat mirrors 624a to 624d may be individual planar mirrors where each mirror's plane is slightly angled with respect to the adjacent mirrors, or they may be differently angled faces of a single monolithic optical element, or a combination of these methods. There may also be more or fewer mirror faces than what is shown in the example embodiment of the sample optic assembly 620. Furthermore, in an alternative embodiment, the focusing optical element 628 may have one or both surfaces which are adapted to compensate for aberrations created by an optical window or transparent region of a sample container (not shown) between the sample optic assembly and the sample, to create a sharper focus and/or smaller size of the focal spots at locations 630a to 630d. Alternatively or in addition, in at least one alternative embodiment, the mirror surfaces 624a to 624d may be adapted to compensate for aberrations created by the optical window or transparent region of a sample container. The individual lenslets or individual mirror faces of both the sample optic assemblies 600 and 620 of FIGS. 9A and 9B, respectively, may typically be 1 mm to 5 mm in size, but may be smaller or larger as required for a particular embodiment. In alternative embodiments, the lenslets or individual mirror faces may be shaped, positioned, and/or angled to create a specific distribution of focal spots which are best suited to the size, shape, or distribution of the portion of the sample that is being illuminated. In different alternative embodiments, the plurality of focal spots may be changed into a plurality of focal lines or a plurality of focal circles by adapting the surfaces of the mirror surfaces 624a to 624d, or adding an additional optical element (not shown), wherein these modifications may act upon the portions of the substantially collimated beam in a fashion similar to optical element 562 of FIG. 8E or optical element 572 of FIG. 8F.

Figure 10:
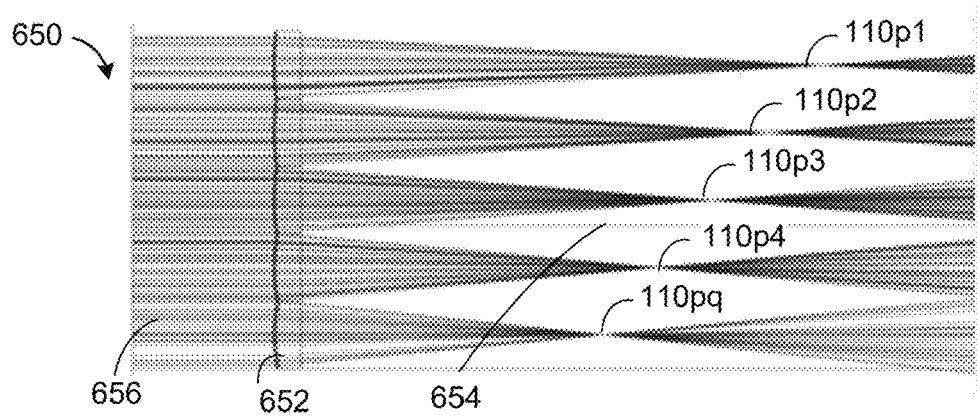
FIG. 10 is a side view of another example embodiment of a lenslet array where each lenslet has a different focal length, causing the focal spots to appear at different distances from the lens and thus at different points within a sample volume.

In another aspect, in accordance with the teachings herein, another example embodiment is illustrated in FIG. 10, which shows a sample optic assembly 650 comprising an array 652 of focusing optical elements that may have different focal lengths, or may be placed at different locations along the main optical axis 654 of the collimated beam 656, so that focal spots are formed at positions that are: (a) at different distances from the probe head and/or (b) at different depths ($110p1$ to $110pq$ where q is an integer) within the sample (not shown). In different embodiments, the array of focusing optical elements can be arranged to provide a 2D array of focal spots such as in FIGS. 9A and 9B or a 1D array such as in FIG. 10. The sample optic assembly 650 may be used for obtaining optical measurements of a substantially transparent and chemically inhomogeneous sample, such that the returning scattered light from the sample may be used by an optical spectroscopic analysis system to assess the average spectral characteristics from many different depths within the sample. The sample optic assembly 650 may also be used for measurements of the surface of an irregular solid sample such as, but not limited to, a powder, pellets, or beads, for example, wherein some of the focal spots may be correctly focused on the sample surface while other focal spots are out of focus, but variations in the overall signal strength will be minimized as each badly focused spot will tend to be balanced by a well-focused spot. In addition, in an alternative embodiment, each focusing optical element of array 652 may have one or both surfaces which are adapted to compensate for aberrations created by an optical window or transparent region of a sample container (not shown) between the sample optic assembly 650 and the sample.

It should be noted that the various configurations of sample optic assemblies described herein that provide a focal line or multiple focal spots are not generally acting as a hyperspectral imager, which is a device in which simultaneous independent spectra are collected from multiple spatial locations in the instrument's field of view. Hyperspectral imaging tends to require more sophisticated optical elements to collect multiple spectra in parallel. The present teachings, in contrast, combine all of the returning scattered light from multiple locations at the sample surface and/or within the sample and focus the returning scattered light into a single collection fiber which results in a single combined spectrum being collected.

In another aspect, in accordance with the teachings herein, both the sample optic assembly configurations that produce a focal line and the sample optic assembly configurations that produce multiple focal spots can be advantageously integrated into or added to a flow cell, which is a device that is commonly used to make spectroscopic measurements of a liquid or slurry sample that flows past an optical focal spot. This integration typically takes the form of a mechanical coupling or linkage between the housing of the sample optic assembly and the housing of the flow cell, in order to position the focal spot(s) or focal line(s) at the surface or within the interior of the flow channel. Conventional spectroscopic flow cells utilizing a single focused spot concentrate all of the excitation power into a small focal spot, which can damage or alter the sample if the optical power density is high enough. Furthermore, these conventional flow cells are also prone to non-representative sampling if the sample medium is inhomogeneous in which case particulates or other regions of chemically distinct sample material can easily pass through the flow cell without passing through the small focal spot of the optical spectroscopy probe. However, in accordance with the teachings herein, embodiments are provided which cause the excitation light beam to be focused into an extended focal line or multiple separate focal spots so that both of these non-representative sampling problems associated with conventional spectroscopic flow cells can be mitigated.

In addition, with the embodiments of FIGS. 7A to 10, the optical measurement zone spread out over a broader area or multiple areas, the sample channels conveying the flowing liquid sample or other sample type can be made very shallow (as measured along the primary optical axis) without unduly impeding or constricting the sample flow. As an example, a single sample channel in a conventional flow cell may be about 0.5 mm in diameter (i.e. 0.5 mm wide and 0.5 mm deep), and therefore prone to blockage by particulates of similar size or flow constriction if the sample fluid is viscous, whereas a shallow, broader channel that is about 0.5 mm deep and about 5.0 mm wide will have about 10 times as much cross-sectional area, permitting smoother fluid flow. The advantage in creating a shallow broader measurement channel is that the excitation light beam will be sampling a substantially constant volume of the sample liquid, regardless of the optical opacity of the sample liquid. In contrast, with a traditional spectroscopic flow cell, the liquid may be several millimeters "deep" at the location of the focused excitation spot. If the sample liquid is relatively transparent, then this is not much of a problem as the excitation light beam can penetrate through the entire depth of the sample liquid and the returning scattered light can return to the probe's collection optics with little attenuation, so the collected spectroscopic signal is strong. However, if the sample liquid is relatively opaque or turbid, with an optical scattering distance (also known as the "mean free path length" or "mean optical scattering path length") that is similar to or less than the depth of the sample channel, then the excitation light beam cannot penetrate as far into the sample, and the returning scattered light may be absorbed or diverted from their path back into the probe's collection optics, so that the effective sample volume being probed is reduced and the spectroscopic signal intensity will be correspondingly reduced. This dependence of the spectroscopic signal intensity upon the sample opacity in traditional spectroscopic flow cells severely complicates the quantitative interpretation of the spectral data.

In accordance with the teachings herein, when a sample channel is used that is shallow (in depth) compared to the minimum optical scattering distance of the sample but broad (in width) to permit greater fluid flow volume, the spectral intensity may be reduced compared to when a deeper sample channel is used, since a smaller volume of sample is being measured, but the spectral intensity will be only minimally dependent upon the sample opacity, yielding more consistent measurement results.

Figure 11A:
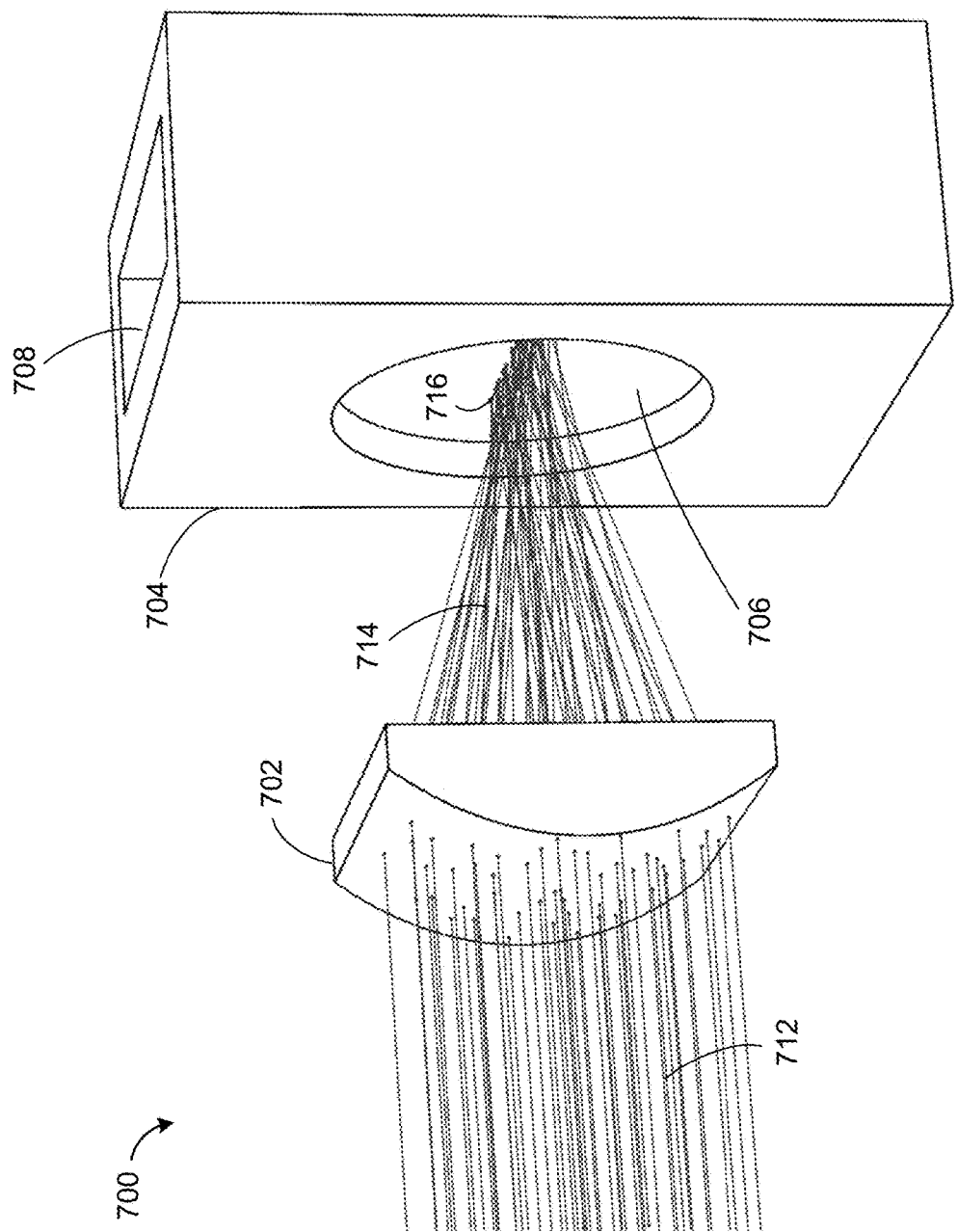
FIGS. 11A and 11B are perspective and partial transparent illustrations, respectively, of an example embodiment of a sample optic assembly for a flow cell where the sample optic assembly includes a cylindrical focusing lens that focuses an incident collimated excitation beam through a sample window creating a focal line which coincides with a narrow region (i.e. shallow sample channel) within the flow volume of the flow cell.
Figure 11B:
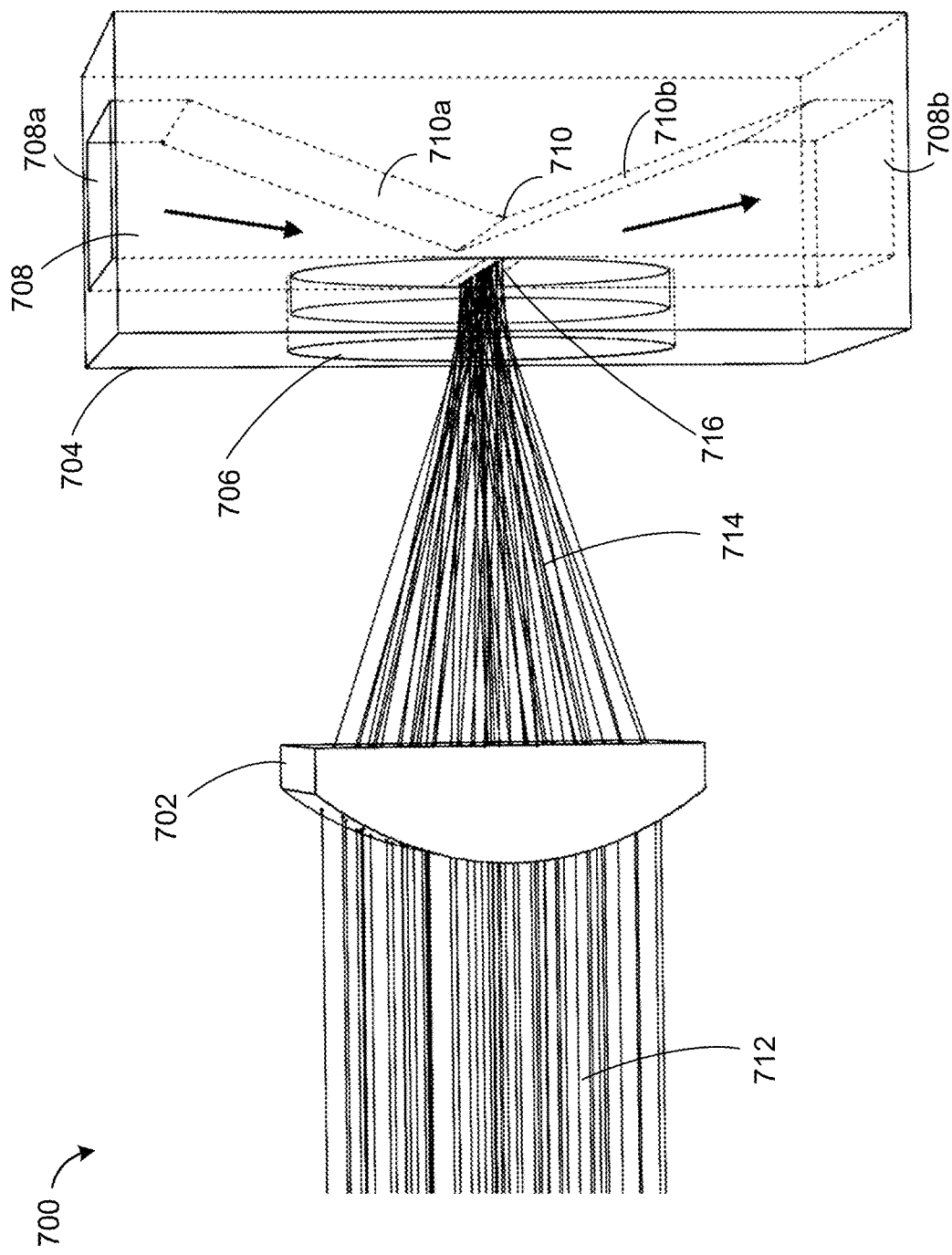

Referring now to FIGS. 11A and 11B, shown therein is a sample optic assembly 700 including a first lens 702, which may be a cylindrical converging focusing lens, and a sample interface 704 having a sample window 706 and a sample flow channel 708 that has an inlet 708a and an outlet 708b and a flow assembly 710 that includes a flow narrowing portion 710a and a flow expanding portion 710b. The sample (not shown) enters the sample flow channel 708 through the inlet 708a and exits through the outlet 708b. The sample flow direction is indicated by the arrows. In alternative embodiments, the positions of the inlet 708a and the outlet 708b may be reversed. The focusing lens 702 focuses a collimated excitation light beam 712 along a first axis into a converging light beam 714 to a single focal line 716 at the surface of the sample window 706 that is adjacent to the sample flow channel 708. The narrowest gap between the flow assembly 710 and the sample window 706 provides a shallow but broad channel for the sample liquid to flow without overly constricting the sample flow rate and without increasing the risk of clogging or blockage of the sample flow channel 708. The sample window may be about 1 mm to about 5 mm thick, and the narrowest region of sample flow channel 708 may be about 0.1 mm to about 1.0 mm wide. In an alternative embodiment, the lens 702 may also have one or both surfaces which are adapted to compensate for aberrations created by the converging beam passing through the window 706.

Figure 11C:
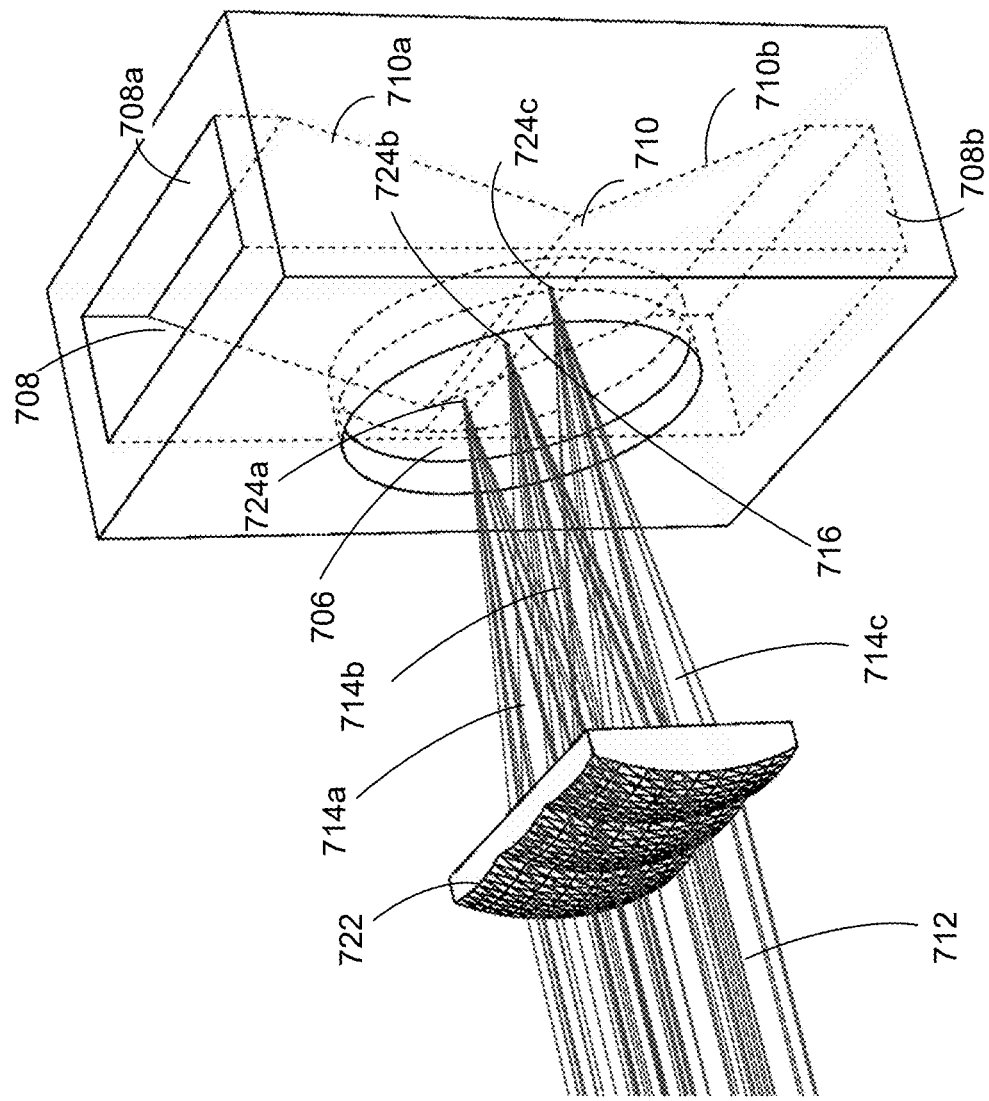
FIG. 11C is a partial transparent illustration of another example embodiment of a sample optic assembly for a flow cell where the sample optic assembly includes a focusing lenslet array that focuses an incident collimated excitation beam through a sample window creating multiple focal spots which coincide with a narrow region within the flow volume of the flow cell.

In an alternative embodiment, there is provided a sample optic assembly 720 comprising an optical element 722 as shown in FIG. 11C. The optical element 722 is different from the optical element 702 in that the optical element 722 is a lenslet array. The sample optic assembly 720 utilizes the optical element 722 (e.g., a 1D array of focusing lenses) for generating a plurality of converging light beams 714a to 714c that then converge into a corresponding plurality of focal spots 724a to 724c that simultaneously illuminate the sample (not shown) at multiple locations along the sample window 706 to gain a more representative spectral measurement of the sample. The optical element 722 may be implemented using a lenslet array, a plurality of individual lens elements, or another optical element(s) that provides the same functionality. In other embodiments, the optical element 722 may be implemented to have a larger or smaller number of lenslets to create a larger or smaller number of converging light beams. Furthermore, in at least one alternative embodiment the surfaces of the lenslet array 722 may be adapted to compensate for aberrations created by the window 706, to reduce the size of and/or sharpen the focus for focal spots 724a to 724c.

It should be noted that in the various embodiments described herein that use a lenslet array having a plurality of optical elements, these elements can be positioned in an arrangement to create the multiple separate focal spots in a pattern including a line, a grid, or other lateral distribution suited to the sample when the sample optic assembly receives the collimated excitation light beam.

In another alternative embodiment, the sample optic assembly 700 or 720 can be modified such that a different optical element or a different number of elements are used instead of the single cylindrical focusing lens 702 or lenslet array 722 to generate a differently sized focal line of excitation light or a different number and/or arrangement of focal spots (such as in the sample optic assembly embodiments of FIG. 8A, 8B, 8C, 8D, 9A, or 9B). For example, this modified sample optic assembly may be used to adjust the length of the focused line of excitation light 716 or the spacing of the plurality of focused spots of excitation light 724a-c to match the width of the single wide shallow channel within the flow channel 708.

In either of the alternative embodiments of the sample optic assembly 700 or 720, the cross-section of the sample flow aperture (i.e. the portion of the sample flow channel near the focal line 716) can be made significantly larger due to a larger focal line or higher number of focal spots, permitting a greater sample flow rate and less susceptibility to clogging.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A sample optic assembly for an optical spectroscopy probe for use in compensating for spherical aberrations and/or chromatic aberrations in obtaining optical measurements of a sample that is behind an optical window or within a transparent container where the optical window and the transparent container are physically separate from the sample optic assembly and have the spherical aberrations and/or the chromatic aberrations, wherein the sample optic assembly comprises:
   at least one optical element that is positioned for receiving a substantially collimated excitation light beam and directing light rays towards the sample, the at least one optical element being positioned and having one or more surfaces that are shaped to:
     project the light rays through the optical window or the transparent container to focus the light rays into at least one focal spot, at least one focal circle, or at least one focal line which are at one or more portions of a surface or an interior of the sample;
     collect resulting scattered light from the sample; and
     counteract the spherical aberrations and/or the chromatic aberrations that are created by the optical window or the transparent container to reduce the size of and/or sharpen the at least one focal spot, the at least one focal circle, or the at least one focal line,
   wherein, the collected resulting scattered light is used by an optical spectroscopy analysis system to measure spectroscopic information about the one or more portions of the sample.

2. The sample optic assembly of claim 1, wherein the at least one optical element comprises one or more aspheric optical elements.

3. The sample optic assembly of claim 1, wherein the at least one optical element comprises a toroidal optical element, having a first profile along a first axis and a second profile along a second axis where the first and second axes are perpendicular to one another and the first and second profiles are different.

4. The sample optic assembly of claim 1, wherein the at least one optical element comprises: (a) one or more spherical optical elements and/or (b) one or more spherically toroidal optical elements.

5. The sample optic assembly of claim 1, wherein the at least one optical element comprises:
an aspherical focuser having a focal position; and
a spherical optical element with at least one spherical surface that is substantially centered upon the focal position of the aspherical focuser,
wherein the sample is placed at the focal position.

6. The sample optic assembly of claim 5, wherein the spherical optical element comprises a full sphere optical element or a partial sphere optical element.

7. The sample optic assembly of claim 1, wherein the at least one optical element has at least one surface that is shaped to create a plurality of focal spots, a plurality of focal lines, or a plurality of focal circles.

8. The sample optic assembly of claim 1, wherein the optical window or the transparent container is integrated with a flow cell assembly that defines a sample channel through which the sample flows and the sample in the flow cell assembly receives the at least one focal spot, the at least one focal line, or the at least one focal circle on a surface or interior thereof.

9. The sample optic assembly of claim 8, wherein the flow assembly comprises a shallow sample channel portion and the at least one optical element is adapted to generate the plurality of focal spots or the at least one focal line to be substantially parallel or substantially perpendicular to a direction of sample flow and coincident with the shallow sample channel portion.

10. The sample optic assembly of claim 8, wherein the sample channel has a depth that is in a range of 0.1 mm to 1 mm.

11. A sample optic assembly for an optical spectroscopy probe, wherein the sample optic assembly comprises:
at least one optical element that: (a) is positioned to receive a substantially collimated excitation light beam from a probe head and transmit a plurality of collimated collection light beams to the probe head and (b) has a plurality of optical surfaces that are positioned and shaped to:
receive the substantially collimated excitation light beam having a plurality of light rays;
project and focus the light rays towards a sample to create a plurality of focal spots, an array of discrete focal spots, a plurality of focal lines, or at least one focal circle, at one or more portions of a surface or an interior of the sample; and
collect and combine resulting scattered light from the sample into the plurality of collimated collection light beams which are received by the probe head and focused into a single collection fiber,
wherein, the collected resulting scattered light is provided to an optical spectroscopy analysis system to measure spectroscopic information about the one or more portions of the sample.

12. The sample optic assembly of claim 11, wherein the at least one optical element has at least one surface which is spherical, aspherical, cylindrical, acylindrical, toroidal, or axicon.

13. The sample optic assembly of claim 11, wherein the at least one optical element has at least one profile for creating each of the plurality of focal lines with a length that is smaller, substantially the same, or larger than the diameter of the collimated excitation light beam that is received by the at least one optical element prior to transmission to the sample.

14. The sample optic assembly of claim 11, wherein the at least one optical element comprises at least one lens, at least one mirror, or a combination thereof, that collectively provide a plurality of optical surface regions that are disposed and operate in parallel with one another to focus separate sections of the substantially collimated excitation light beam to simultaneously create the plurality of focal spots, the plurality of focal lines, or the at least one focal circle that are disposed at the one or more portions of the surface or the interior of the sample.

15. The sample optic assembly of claim 11, wherein the at least one optical element includes a lenslet array or an array of reflective mirror surfaces that collectively provide a plurality of optical surface regions that are disposed and operate in parallel with one another to create the plurality of focal spots, the plurality of focal lines, or a plurality of focal circles in a pattern including a line or a grid when the sample optic assembly receives the substantially collimated excitation light beam.

16. The sample optic assembly of claim 14, wherein the plurality of optical surface regions have different focal lengths or are placed at different positions along the optical axis of the substantially collimated excitation light beam to focus the light rays (a) at different distances from the probe head and/or (b) at different depths within the sample.

17. The sample optic assembly of claim 11, wherein the at least one optical element has at least one surface which is adapted to counteract spherical aberrations and/or chromatic aberrations that are created by an optical window that the sample is behind or a transparent container that the sample is contained in, to reduce the size of and/or sharpen the plurality of focal spots, the plurality of focal lines, or the at least one focal circle, where the optical window or the transparent container are separate from the sample optic assembly and are located between the sample optic assembly and the sample.

18. The sample optic assembly of claim 11, wherein the sample optic assembly is integrated with a flow cell that is adjacent to the at least one optical element and includes a flow assembly that defines a sample channel through which the sample flows and an optical window that is disposed on a surface of the flow cell and adjacent to the sample channel for receiving the at least one focal spot, the plurality of focal lines, or the at least one focal circle.

19. The sample optic assembly of claim 18, wherein the flow assembly comprises a shallow sample channel portion and the at least one optical element is adapted to generate the plurality of focal spots or the plurality of focal lines to be substantially parallel or substantially perpendicular to a direction of sample flow and coincident with the shallow sample channel portion.

20. The sample optic assembly of claim 18, wherein the sample channel has a depth that is in a range of 0.1 mm to 1 mm.

* * * * *